United States Patent
Patil et al.

(10) Patent No.: US 12,524,612 B1
(45) Date of Patent: Jan. 13, 2026

(54) METRIC FOR ASSESSING A QUALITY OF ONE OR MORE PARAPHRASES

(71) Applicant: Wells Fargo Bank, N.A., San Francisco, CA (US)

(72) Inventors: Omkar Patil, Gujarat (IN); Rahul Singh, Charlotte, NC (US); Tarun Joshi, New York City, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 419 days.

(21) Appl. No.: 18/066,798

(22) Filed: Dec. 15, 2022

Related U.S. Application Data

(60) Provisional application No. 63/366,998, filed on Jun. 24, 2022.

(51) Int. Cl.
*G06F 40/284* (2020.01)
*G06F 40/30* (2020.01)
*G06F 40/56* (2020.01)

(52) U.S. Cl.
CPC ............ *G06F 40/284* (2020.01); *G06F 40/30* (2020.01); *G06F 40/56* (2020.01)

(58) Field of Classification Search
CPC ......... G06F 40/284; G06F 40/30; G06F 40/56
See application file for complete search history.

(56) References Cited

U.S. PATENT DOCUMENTS

| | | | | |
|---|---|---|---|---|
| 11,593,555 | B1 * | 2/2023 | Anthony | G06F 40/205 |
| 2014/0279763 | A1 * | 9/2014 | Madnani | G06N 20/00 |
| | | | | 706/12 |
| 2017/0235848 | A1 * | 8/2017 | Van Dusen | G06Q 30/0201 |
| | | | | 705/12 |
| 2018/0075015 | A1 * | 3/2018 | Bennett | G06F 40/56 |
| 2018/0329882 | A1 * | 11/2018 | Bennett | G06N 20/00 |
| 2019/0392066 | A1 * | 12/2019 | Kim | G06F 16/24578 |
| 2020/0372217 | A1 * | 11/2020 | Abuammar | G06F 40/53 |

(Continued)

OTHER PUBLICATIONS

Hailu, Tulu Tilahun, Junqing Yu, and Tessfu Geteye Fantaye. "Intrinsic and extrinsic automatic evaluation strategies for paraphrase generation systems." Journal of Computer and Communications 8.02 (2020): 1. (Year: 2020).*

(Continued)

*Primary Examiner* — Andrew C Flanders
*Assistant Examiner* — Theodore Withey
(74) *Attorney, Agent, or Firm* — Shumaker & Sieffert, P.A.

(57) ABSTRACT

A computing system includes a memory; and processing circuitry in communication with the memory. The processing circuitry is configured to: receive a paraphrase comprising a paraphrase text sample corresponding to an original text sample; and calculate a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes.

19 Claims, 9 Drawing Sheets

(56) References Cited

U.S. PATENT DOCUMENTS

| | | | | |
|---|---|---|---|---|
| 2022/0067284 A1* | 3/2022 | He | ........................ | G06F 16/345 |
| 2024/0354518 A1* | 10/2024 | Ranganathan | ........ | G06F 40/284 |
| 2025/0173506 A1* | 5/2025 | Butvinik | ............... | G06F 40/295 |

OTHER PUBLICATIONS

Bandel, Elron, et al. "Quality controlled paraphrase generation." arXiv preprint arXiv:2203.10940 (2022). (Year: 2022).*

Duong, Thanh, et al. "ParKQ: An automated Paraphrase ranking Quality measure that balances semantic similarity with lexical diversity." Natural Language Processing Journal 6 (2024): 100054. (Year: 2024).*

Patil et al., "Understanding Metrics for Paraphrasing", May 26, 2022, 19 pp., URL: https://arxiv.org/abs/2205.13119.

* cited by examiner

| EOS | She played well but lost. | SEP | Although she lost, she played well. | EOS |
|---|---|---|---|---|
| EOS | Homework should be done on time | SEP | Do your homework on time | EOS |
| EOS | I live here. | SEP | Here is where I live. | EOS | PAD | PAD |

| PAD | EOS | She played well but lost | SEP |
|-----|-----|--------------------------|-----|
| EOS | Homework should be done on time | | SEP |
| PAD | PAD | EOS | I live here | SEP |

FIG. 6

METRIC FOR ASSESSING A QUALITY OF ONE OR MORE PARAPHRASES

This application claims the benefit of U.S. Provisional Application No. 63/366,998, filed on Jun. 24, 2022, the entire content of which is incorporated herein by reference.

TECHNICAL FIELD

The disclosure relates to computing systems, and more specifically, computing systems executing metrics for evaluating paraphrases.

BACKGROUND

A paraphrase is a restatement of an original text that seeks to preserve a meaning of the original text. Computing systems may execute models to automatically generate one or more paraphrases. These models may include machine learning models, deep learning models, or other kinds of models. The quality of computer-generated paraphrases may vary based on several factors including, but not limited to, the kind of model used to generate the paraphrase, the set of training data used to create the model, and the parameters used to create the model.

SUMMARY

In general, this disclosure describes techniques for determining a quality of a paraphrase using a single metric that accounts for adequacy of the paraphrase, a level of novelty of the paraphrase, and fluency of the paraphrase. High-quality paraphrases preserve the meaning of the original text. The extent to which a paraphrase preserves the meaning of the original text may be referred to herein as paraphrase "adequacy." High-quality paraphrases are novel, meaning that they are substantially different from the original text. High-quality paraphrases are also fluent, meaning that the paraphrase is understandable to readers. A paraphrase may have low-quality when the paraphrase is very similar to the original text, when the paraphrase conveys a different meaning than the original text, or when the paraphrase is difficult or awkward to understand. A single metric that accounts for adequacy, novelty, and fluency of a paraphrase may provide a better indication of the quality of a paraphrase as compared with metrics that only consider adequacy, only consider novelty, or only consider fluency. Using a single metric that considers adequacy, novelty, fluency, and in some examples one or more other factors may provide an accurate picture of the quality of the paraphrase, because the single metric takes into account more than one characteristic that determines the quality of the paraphrase.

Since adequacy represents the extent to which the paraphrase maintains the meaning of the original text, adequacy may serve as an initial quality measure of the paraphrase. In other words, a paraphrase with a high adequacy may initially be considered a high-quality paraphrase. But since novelty and fluency also affect the quality of a paraphrase, it may be beneficial for the system to "penalize" adequacy based on the novelty and fluency. This may prevent paraphrases that score high for adequacy but score low for novelty and/or fluency from scoring highly for the single metric.

In some cases, the single metric described herein may take into account a length of the paraphrase relative to the length of the original text. For example, paraphrases that are substantially longer or substantially shorter than the original text may have lower quality than paraphrases that are similar in length to the original text. The single metric may be penalized when the paraphrase differs in length from the original text, thus preventing paraphrases from scoring highly when they have novelty only because they are substantially longer than the original text but include most or all of the same words as the original text. Considering the length of the paraphrase further strengthens the single metric as an effective indicator of paraphrase quality.

A single metric that takes into account many characteristics may allow a system to determine a general quality of a paraphrase by taking account of many complex factors that are hard to quantify in the human mind. For example, it may be difficult to determine the extent to which a paraphrase is similar to the original text, or the extent to which the paraphrase conveys the same meaning as the original text. The system may quantify adequacy, novelty, and fluency so that the system may calculate the single metric. The system may calculate a metric value for each paraphrase, allowing users to compare metric values corresponding to different paraphrases in a way that would not be possible for a human mind to perform.

A paraphrase generation system may, in some cases, execute a paraphrase model to generate paraphrases for one or more original text samples. A paraphrase quality evaluation system may use the single metric described herein to evaluate a quality of paraphrases generated by the paraphrase generation system. Evaluating the quality of auto-generated paraphrases may be beneficial so that the paraphrase model can be tested for robustness and re-trained or otherwise adjusted if the quality of generated paraphrases is not adequate. In some examples, the paraphrase generation model may generate one or more paraphrases for input to another model (e.g., a text classification model) such that the paraphrase quality evaluation system may, at least in part, test a robustness of the other model by testing a quality of paraphrases generated by the paraphrase generation model. Additionally, or alternatively, the paraphrase model may be used for data augmentation.

In some cases, metric values calculated by the paraphrase quality evaluation system may be used to generate a training set of high-quality paraphrases to train one or more paraphrase models. The paraphrase quality evaluation system is not limited to evaluating auto-generated paraphrases. The paraphrase quality evaluation system may use the single metric to evaluate a quality of any paraphrase, including a paraphrase written by a human. The paraphrase generation system may, in some examples, select one paraphrase for evaluation from a set of candidate paraphrases each generated based on the same original text.

In one example, a computing system includes: a memory; and processing circuitry in communication with the memory. The processing circuitry is configured to: receive a paraphrase comprising a paraphrase text sample corresponding to an original text sample; and calculate a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes. Additionally, the processing circuitry is configured to save the paraphrase metric value corresponding to the paraphrase to a paraphrase metric database; and save the paraphrase and the paraphrase metric value to one or more of a set of testing data or a set of training data for a paraphrase generation model.

In another example, a method includes: receiving, by processing circuitry in communication with a memory, a paraphrase comprising a paraphrase text sample corresponding to an original text sample; and calculating, by the processing circuitry, a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes. Additionally, the method includes saving, by the processing circuitry, the paraphrase metric value corresponding to the paraphrase to a paraphrase metric database; and saving, by the processing circuitry, the paraphrase and the paraphrase metric value to one or more of a set of testing data or a set of training data for a paraphrase generation model.

In another example, a non-transitory computer readable medium includes instructions that when executed cause one or more processors to: receive a paraphrase comprising a paraphrase text sample corresponding to an original text sample; calculate a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes; save the paraphrase metric value corresponding to the paraphrase to a paraphrase metric database; and save the paraphrase and the paraphrase metric value to one or more of a set of testing data or a set of training data for a paraphrase generation model.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 4 is a conceptual diagram illustrating an input to a paraphrase generation model for fine-tuning a paraphrase generation model, in accordance with one or more techniques of this disclosure.

FIG. 6 is a conceptual diagram illustrating an input for performing batch generation using a GPT-2 paraphrase generation model, in accordance with one or more techniques of this disclosure.

DETAILED DESCRIPTION

Figure 1:
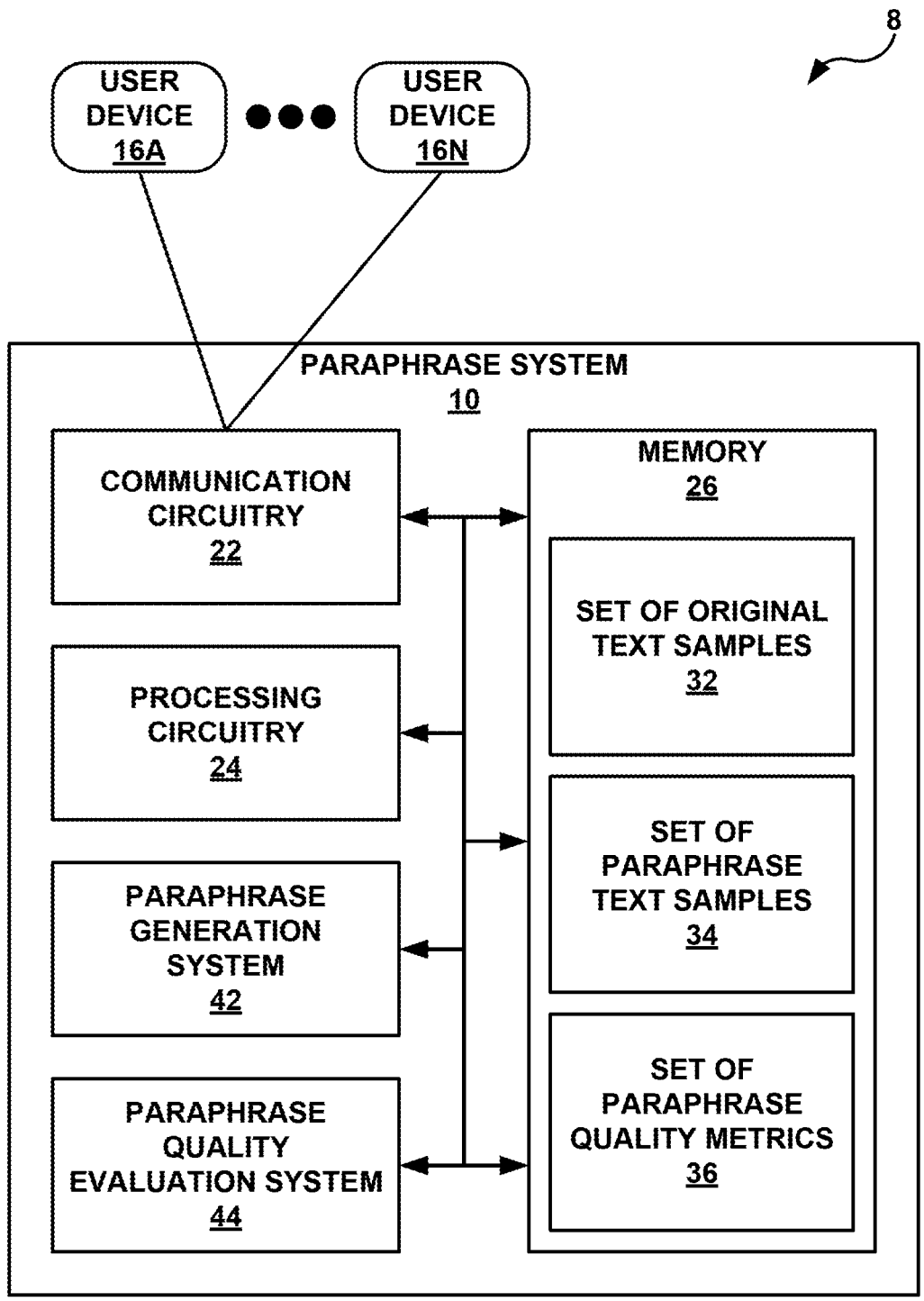
FIG. 1 is a block diagram illustrating a network that includes a paraphrase system and a set of user devices, in accordance with one or more techniques of this disclosure.

FIG. 1 is a block diagram illustrating a network 8 that includes a paraphrase system 10 and a set of user devices 16A-16N, in accordance with one or more techniques of this disclosure. As seen in FIG. 1, paraphrase system 10 includes communication circuitry 22, processing circuitry 24, and a memory 26. Memory 26 may be configured to store a set of original text samples 32, a set of paraphrase text samples 34, and a set of paraphrase quality metrics 36. Paraphrase system 10 may include a paraphrase generation system 42 and a paraphrase quality evaluation system 44.

Paraphrase system 10 may be configured to evaluate a quality of one or more paraphrases. A paraphrase is a restatement of an original text that generally preserves the meaning of the original text. Paraphrases can differ in quality based on whether the paraphrase is actually different from the original text, and based on whether the paraphrase is easy to understand and conveys the same meaning as the original text. Paraphrases that are only different from the original text because they are longer than the original text, but include many or all of the same words as the original text, may be considered low quality paraphrases. Paraphrase system 10 may apply a single metric that takes into account more than one paraphrase characteristic in order to determine a quality of one or more paraphrases.

Each of user devices 16A-16N (collectively, "user devices 16") may be any suitable communication or computing device, such as a conventional or landline phone, or a mobile, non-mobile, wearable, and/or non-wearable computing device capable of communicating within network 10. One or more of user devices 16 may support communication services over packet-switched networks, e.g., the public Internet.

Communication circuitry 22 may include any suitable hardware, firmware, software or any combination thereof for communicating with another device, such as any one or combination of user devices 16 or another device. Communication circuitry 22 may receive downlink telemetry from, as well as send uplink telemetry to, user devices 16 or another device with the aid of an internal or external antenna. In some examples, communication circuitry 22 may include one or more connections for wired links with other devices.

Processing circuitry 24, in some examples, may include one or more processors that are configured to implement functionality and/or process instructions for execution within paraphrase system 10. For example, processing circuitry 24 may be capable of processing instructions stored in memory 26. Processing circuitry 24 may include, for example, microprocessors, digital signal processors (DSPs), application specific integrated circuits (ASICs), field-programmable gate arrays (FPGAs), equivalent discrete or integrated logic circuitry, or a combination of any of the foregoing devices or circuitry. Accordingly, processing circuitry 24 may include any suitable structure, whether in hardware, software, firmware, or any combination thereof, to perform the functions ascribed herein to processing circuitry 24.

Memory 26 may be configured to store information within paraphrase system 10 during operation. The memory may include a computer-readable storage medium or computer-readable storage device. In some examples, the memory includes one or both of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 26 is used to store program instructions for execution by processing circuitry 24.

Memory 26 may store a set of original text samples 32, a set of paraphrase text samples 34, and a set of paraphrase quality metrics 36. Each original text sample of original text samples 32 may include a set of characters that may, in some cases, form a set of words (e.g., a complete sentence, an incomplete sentence, a phrase, or a single word). In some examples, each original text sample of original text samples 32 may convey a meaning. Each paraphrase text sample of the set of paraphrase text samples 34 may include a set of characters that may, in some cases, form a set of words (e.g., a complete sentence, an incomplete sentence, a phrase, or a single word). In some examples, each paraphrase text sample of the set of paraphrase text samples 34 may restate one of the set of original text samples 32. Each paraphrase text sample of the set of paraphrase text samples 34 may convey a meaning. Quality paraphrase text samples may convey substantially the same meaning as its respective original text samples.

In some examples, one of the set of original text samples 32 may correspond to more than one paraphrase of the set of paraphrase text samples 34. That is, paraphrase system 10 may generate more than one paraphrase for each original text sample of the set of original text samples 32. But in some cases, at least some original text samples of the set of original text samples 32 may correspond to only one paraphrase text sample of the set of paraphrase text samples 34. Each paraphrase quality metric of the set of paraphrase quality metrics 36 may correspond to a respective paraphrase text sample of the set of paraphrase text samples 34. Each paraphrase quality metric of the set of paraphrase quality metrics may indicate a quality of the respective paraphrase text sample of the set of paraphrase text samples 34.

Paraphrase generation system 42 may, in some cases, generate one or more paraphrase text samples of the set of paraphrase text samples 34. Paraphrase generation system 42 may, in some cases, control processing circuitry 24 to execute a paraphrase generation model in order to generate the one or more paraphrase text samples of the set of paraphrase text samples 34. In some examples, paraphrase generation system 42 may generate the one or more paraphrase text samples of the set of paraphrase text samples 34 based on one or more original text samples of the set of original text samples 32. For example, paraphrase generation system 42 may control processing circuitry 24 to generate, based on an original text sample of the set of original text samples 32, one or more paraphrase text samples of the set of paraphrase text samples 34. Processing circuitry 24 may execute a paraphrase generation model to generate one or more paraphrase text samples of the set of paraphrase text samples 34. The paraphrase generation model may use an artificial neural network (ANN), deep neural network (DNN), or another kind of neural network.

Paraphrase quality evaluation system 44 may control processing circuitry 24 to generate the set of paraphrase quality metrics 36 to indicate a quality of one or more paraphrase text samples of the set of paraphrase text samples 34. In some examples, paraphrase quality evaluation system 44 may receive a paraphrase comprising a paraphrase text sample of the set of paraphrase text samples 34. The paraphrase text sample may be a paraphrase of an original text sample. In some examples, the paraphrase text sample the original text sample using one or more different words or characters while substantially preserving the meaning of the original text sample. In some examples, paraphrase generation system 42 generates the paraphrase text sample based on one or the set of original text samples 32, but this is not required. In some examples, the paraphrase text sample is generated by another system or received by paraphrase system 10 from one or user devices 16.

Paraphrase quality evaluation system 44 may control processing circuitry 24 to calculate, a paraphrase metric value corresponding to a paraphrase text sample of the set of paraphrase text samples 34. In some examples, processing circuitry 24 may calculate the paraphrase metric value based on an adequacy score, a novelty score and a fluency score as inputs. The adequacy score may indicate an extent to which the paraphrase preserves a meaning of the original text. The novelty score may indicate a level of difference between the paraphrase text sample and the original text sample. The fluency score may indicate an extent to which the paraphrase text sample is devoid of repetition, spelling, and grammatical mistakes. Quality paraphrases may restate the original text using different words and/or characters and preserve the meaning of the original text in a way that is fluent and understandable to readers. By calculating the paraphrase metric based on an adequacy score, a novelty score and a fluency score as inputs, the paraphrase quality evaluation system 44 may take into account the extent to which the paraphrase text sample preserves the meaning of the original text sample, the extent to which the paraphrase text sample restates the original text sample using different words, and the extent to which the paraphrase text sample is understandable and preserves the meaning of the original text sample.

To calculate the paraphrase metric value, paraphrase quality evaluation system 44 may control processing circuitry 24 to determine the adequacy score. In some examples, paraphrase quality evaluation system 44 uses another metric as a proxy for adequacy. In some examples, paraphrase quality evaluation system 44 controls processing circuitry 24 to determine the adequacy score. In some examples, paraphrase quality evaluation may use another metric as an approximation for paraphrase adequacy, but this is not required. In some examples, processing circuitry 24 determines the adequacy score based on the paraphrase text sample and the original text sample. To calculate the paraphrase metric value, paraphrase quality evaluation system 44 may control processing circuitry 24 to calculate the novelty score. The processing circuitry 24 calculates the novelty score based on a benchmark parameter value corresponding to a set of paraphrase text samples each corresponding to the respective original text sample and a source parameter value corresponding to the respective paraphrase text sample. Additionally, or alternatively, to calculate the paraphrase metric value, paraphrase quality evaluation system 44 may control processing circuitry 24 to calculate the fluency score. Processing circuitry 24 may calculate the fluency score based on the benchmark parameter value and the source parameter value.

In some examples, paraphrase quality evaluation system 44 may control processing circuitry 24 to calculate the paraphrase metric value based on the adequacy score, the novelty score and the fluency score. For example, paraphrase evaluation system 44 may control processing circuitry 24 to calculate the paraphrase metric value by multiplying together the adequacy score, the novelty score, and the fluency score. Paraphrase evaluation system 44 may, in some examples, control processing circuitry 24 calculate the paraphrase metric value by multiplying one or more other parameters together with the adequacy score, the novelty score, and the fluency score.

In some examples, paraphrase quality evaluation system 44 may determine the paraphrase metric value based on a paraphrase length score as an input. The paraphrase length score may indicate an extent to which a length of the paraphrase text sample differs from a length of the respective original text sample. In some examples, a paraphrase text sample that is significantly shorter or longer than the respective original text sample may be a lower-quality paraphrase than a paraphrase text sample that is substantially the same length as the respective original text sample. In some examples, to calculate the paraphrase metric value, the paraphrase quality evaluation system 44 controls the processing circuitry 24 to calculate the paraphrase length score based on the length of the paraphrase text sample and a length of the original text sample. The paraphrase length score may be calculated based on the length of the paraphrase text sample and the length of the original text sample. Paraphrase quality evaluation system 44 may, in some cases, control processing circuitry 24 to calculate the paraphrase metric value by multiplying together the adequacy score, the novelty score, the fluency score, and the paraphrase length score.

In some examples, paraphrase quality evaluation system 44 may control processing circuitry 24 to calculate the paraphrase metric value based on an adequacy score, a novelty score, a fluency score, and a paraphrase length score. The adequacy score may indicate an extent to which the paraphrase preserves a meaning of the original text. The novelty score may indicate an extent to which the paraphrase text sample is similar (or different) from the original text. The fluency score may indicate an extent to which the paraphrase sample is easy to understand. The paraphrase length score may indicate a length of the paraphrase text sample relative to a length of the respective original text sample. In some examples, to calculate the paraphrase metric value, paraphrase quality evaluation system 44 may control processing circuitry 24 to multiply the adequacy score, the novelty score, the fluency score, and the paraphrase length score.

In some examples, when the novelty score is less than one, the novelty score weighs towards decreasing the paraphrase metric value so that the paraphrase metric value is lower than the adequacy score. For example, because the paraphrase quality evaluation system 44 may control processing circuitry 24 to multiply the adequacy score and the novelty score, the novelty score causes the paraphrase metric value to decrease lower than the adequacy score when the novelty score is less than one. Additionally, or alternatively, when the fluency score is less than one, the fluency score weighs towards decreasing the paraphrase metric value so that the paraphrase metric value is lower than the adequacy score. When the paraphrase length score is less than one, the paraphrase length score weighs towards decreasing the paraphrase metric value so that the paraphrase metric value is lower than the adequacy score.

Limitations of text generation techniques, difficulties in defining what qualifies as a paraphrase, and difficulties in creating metrics to measure the quality of paraphrases may lead to inaccurate determinations of paraphrase quality. One or more techniques described herein include using a single metric that considers more than one paraphrase characteristic in order to determine a quality of the paraphrase. Using a single metric may lead to a more reliable measure of paraphrase quality as compared with systems that use many different metrics or use a single metric that does not consider more than one different paraphrase characteristic. In some examples, paraphrase system 10 may use a metric $ROUGE_P$ to measure the quality of paraphrases along the dimensions of adequacy, novelty and fluency. The metric $ROUGE_P$ may be more effective than current natural language generation metrics in identifying and applying the desired properties of a quality paraphrase. In some examples, paraphrase system 10 may use one or more metrics including $ROUGE_P$ in order to evaluate one or more paraphrases. Additionally, or alternatively, paraphrase system 10 may use one or more metrics including $ROUGE_P$ in order to train and/or refine one or more paraphrase generation models executed by paraphrase generation system 42.

Sentential paraphrasing includes generating paraphrases for a given sentence. Two sentences may be paraphrases of each other if they convey the same meaning in different words. A quality paraphrase preserves semantics of the original sentence. In other words, a quality paraphrase conveys substantially the same meaning of the original text. Additionally, or alternatively, a quality paraphrase avoids appearing similar to the original text in terms of words and/or sentence structure. Applications of paraphrasing include data augmentation and robustness testing. Paraphrase generation models may use long short-term memory (LSTM), autoencoders, transformers, or any combination thereof. Paraphrases may be evaluated based on adequacy, novelty, fluency, correctness, or any combination thereof. In some examples, it may be beneficial to evaluate paraphrases based on all paraphrase characteristics that are measurable. In some examples, paraphrase adequacy may include an extent to which the semantics (e.g., the meaning) of the original text is preserved in the paraphrase text. In some examples, paraphrase fluency may include an extent to which the paraphrase text is devoid of repetition, spelling, and grammatical mistakes. Put another way, paraphrase fluency may represent the extent to which the paraphrase text is easily understandable to a reader. In some examples, paraphrase novelty may represent an extent to which the paraphrase text is different from the original text. Paraphrase correctness mar represent an extent to which the paraphrase text includes any information that contradicts the meaning of the original text or includes hallucinations that are outside of a scope of the original text.

It may be beneficial for a paraphrase quality metric to accept input scores that indicate paraphrase characteristics such as adequacy, novelty, fluency, correctness, paraphrase length, or any combination thereof. In some examples, a paraphrase metric that considers two or more of these factors may more adequately measure paraphrase quality than a paraphrase metric that only considers one of these factors. In some cases, a paraphrase metric that measures paraphrase quality may increase in accuracy as more factors are considered. That is, a paraphrase metric that considers novelty, fluency, and adequacy may be more accurate in determining paraphrase quality than a paraphrase metric that only considers fluency and adequacy. Paraphrase system 10 may use one or more paraphrase metrics that accept as inputs scores that consider two or more paraphrase characteristics. The metric $ROUGE_P$, for example, accepts an adequacy score, a novelty score, a fluency score, and a paraphrase length score as inputs.

Paraphrase system 10 includes paraphrase generation system 42 configured to use paraphrase generation models to generate one or more paraphrases. Paraphrase system 10 includes paraphrase quality evaluation system 44 configured to calculate one or more paraphrase quality metrics. For example, paraphrase quality evaluation system 44 may calculate one or more $ROUGE_P$ values to indicate a quality of one or more paraphrase text samples 34. $ROUGE_P$ may solve one or more shortcomings of other paraphrase quality metrics.

$ROUGE_P$ may, in some examples, incorporate paraphrase adequacy, paraphrase novelty, and paraphrase fluency. By using $ROUGE_P$ and/or other paraphrase metrics, paraphrase system 10 may quantify vocabulary diversity in model output and understand how model fine-tuning affects diversity, and adequacy and novelty of generated paraphrases. $ROUGE_P$ may include a selection metric for candidate paraphrases to manage a trade-off between their adequacy and novelty. $ROUGE_P$ may be more effective than other paraphrase quality metrics such as bilingual evaluation understudy (BLEU), metric for evaluation for translation with explicit ordering (METEOR), recall oriented understudy for gisting evaluation (ROUGE), paraphrase in n-gram changes (PINC), and translation edit rate (TER) in evaluating paraphrase quality.

Paraphrase quality evaluation system 44 may be configured to use several different metrics that evaluate a quality paraphrases, including but not limited to $ROUGE_P$. Paraphrase generation system 42 may apply one or more paraphrase generation models (e.g., generative pre-trained transformer 2 (GPT-2)) to generate paraphrases. Paraphrase system 10 may use one or more techniques described herein to develop one or more paraphrase models. Paraphrase system 10 may analyze paraphrase evaluation using $ROUGE_P$. Paraphrase quality metrics such as $ROUGE_P$ may enhance an analysis of paraphrase model fine-tuning and generation.

Paraphrase system 10 may use several paraphrase quality metrics to evaluate model generated paraphrases with reference during testing. Metrics such as BLEU, METEOR, ROUGE, and TER may measure an adequacy of one or more paraphrases. Metrics such as PINC may measure a novelty of one or more paraphrases. Metrics such as selfBLEU may measure diversity of one or more paraphrases. Metrics such as PEM may perform phrasal paraphrasing. $ROUGE_P$ may, in some cases, be configured to evaluate a quality of paraphrases of longer sections of texts, including complete sentences. $ROUGE_P$ is not limited to merely evaluating paraphrases of short phrases.

As used herein, the term "ref" refers to samples of original text and the term "cand" refers to paraphrase text samples. The term "gen" may refer to a final paraphrase text sample selected from a candidate set as a model output paraphrase text sample.

In some examples, paraphrase quality metrics interpret text at the corpus level and not for individual sentence pairs. One or more example datasets comprise pairs of sentences which are paraphrases of each other, referred to as S1 and S2, where S1 is an input to a model, and the gen paraphrase text sample may be evaluated based on either S1 or S2. Some datasets such as Microsoft Common Objects in Context (MSCOCO) captions offer multiple sentences as paraphrases of each other. For MSCOCO, an input to the model may be S1 and the gen paraphrase text may be compared with S1, S2, S3, S4, or S5.

One or more models, including models based on GPT-2, may generate paraphrases based on original text input to the models. GPT-2 comprises language generation capabilities. Paraphrase generation system 42 may use one or more GPT-2 models to generate candidate paraphrases by filtering one or more paraphrases using a sentence similarity score, and using the metric $ROUGE_L$ with the original text input to the model. In some examples, paraphrase generation system 42 may refine a GPT-2 model using unsupervised learning, where the input to the model comprises a corrupted form of the output from the model. The input to the model may be corrupted by removing stop words, random shuffling, and synonym substitution. Paraphrase generation system 42 may generate paraphrases using the GPT-2 model and filter the generated paraphrases by evaluating a level of similarity between each generated paraphrase and the input text.

Semantic similarity (e.g., similar meaning) to the original text is only one characteristic that indicates a quality paraphrase. In addition to being semantically similar to the original text, a quality paraphrase is distinct from the input sentence (e.g., uses different words and/or sentence structure). Paraphrase novelty is for determining paraphrase adequacy scores, because a paraphrase that "parrots" the original text and thus conveys the same meaning as the original text may score highly for paraphrase adequacy, even though the paraphrase is low-quality because it merely repeats the same words and sentence structure of the original text. Consequently, it may be beneficial for a paraphrase metric to consider both paraphrase adequacy and paraphrase novelty. Some metrics may score paraphrases that parrot the original text highly. Some metrics do not report evaluate a novelty of a paraphrase and do evaluate a paraphrase adequacy.

In some examples, the BLEU metric may be used as a paraphrase adequacy metric. In some examples, the PINC metric may be used as a lexical dissimilarity (e.g., novelty) metric. That is, the BLEU metric may indicate paraphrase adequacy without indicating paraphrase novelty, and the PINC metric may indicate paraphrase novelty without indicating paraphrase adequacy. In some examples, there may be a negative correlation between the BLEU metric and human judgement of adequacy for paraphrasing, and PINC might not be an adequate as a dissimilarity metric for reversed paraphrases.

Paraphrase system 10 may use a single metric ROUGEP that takes both adequacy and novelty into account, and overcomes the deficiencies of BLEU and PINC with respect to adequacy and novelty respectively. ROUGEP may account for both adequacy and novelty at phrasal level paraphrasing. ROUGEP may represent a ROUGE-based paraphrasing metric that accounts for adequacy (srcROUGE1), novelty (nf), and fluency (ff). Metrics with "src" affixed in front may be calculated with the input S1 (srcPINC is written as PINC itself). In some examples, srcROUGE1 may be referred to herein as an "adequacy score."

$$nf = \left(1 - \left(\frac{\max(srcROUGE_L - benchROUGE_L, 0)}{1 - benchROUGE_L}\right)^{\beta}\right) \quad \text{(eq. 1)}$$

$$ff = \left(1 - \left(\frac{\max(benchROUGE_L - srcROUGE_L, 0)}{benchROUGE_L}\right)^{\gamma}\right) \quad \text{(eq. 2)}$$

$$lenpen = \min\left(1, \exp\left(1 - \frac{genlength}{srclength}\right)\right) \quad \text{(eq. 3)}$$

$$ROUGE_P = srcROUGE_L \& \; nf \& \; ff < lenpen \quad \text{(eq. 4)}$$

Here, benchROUGE$_L$ is a benchmark parameter that corresponds to an average ROUGE$_L$ parameter for a group of paraphrase text samples corresponding to the same original text sample, for a whole corpus of text. The parameter nf represents a novelty factor that indicates novelty when srcROUGE$_L$ exceeds the benchROUGE$_L$. In some cases, nf may be referred to herein as a "novelty score." For example, the nf parameter may "penalize" srcROUGE$_1$ (e.g., the adequacy score) at a polynomial rate. In other words, when the paraphrase is not very dissimilar from the original text, the nf parameter may be less than 1, lowering the ROUGE$_P$ parameter calculated by multiplying nf with other parameters. The nf parameter may be 0 when the paraphrase text sample and the original text sample are identical.

The parameter ff may represent a fluency factor. In some cases, the ff parameter may be referred to herein as a "fluency score." The ff parameter may prevent the ROUGE$_P$ metric from scoring high when ROUGE$_L$ drops very low but ROUGE$_1$ is still high, which may occur when a paraphrase text sample is not fluent, jumbled, or otherwise difficult to understand. The ff parameter decreases the ROUGE$_P$ metric at a lower rate initially than the nf parameter, when srcROUGE$_L$ is lower than the benchmark.

The lenpen parameter may prevent a paraphrase text sample that is longer than the input to score high with ROUGE$_P$, even when the paraphrase merely adds extra words to the original text while keeping all or many of the same words from the original text. In equation 3, genlength may correspond to a length of the paraphrase text sample, and srclength may correspond to a length of the original text sample. In some examples, the lenpen parameter may be referred to herein as a "paraphrase length score."

In some examples, the β parameter of equation 1 is a constant number (e.g., 2). The β parameter is not meant to be limited to any one number. Although one example number that the β parameter can include is the number 2, the β parameter may include any constant number. In some examples, β may limit a penalization of ROUGE$_P$ caused by the nf parameter to 0.99 for $$\frac{1 - benchROUGE_L}{10}$$

when srcROUGE$_L$ is greater than benchROUGE$_L$. In some examples, the γ parameter of equation 2 is a constant number (e.g., 7). The γ parameter is not meant to be limited to any one number. Although one example number that the β parameter can include is the number 7, the γ parameter may include any constant number. In some examples, γ may limit a penalization of ROUGE$_P$ caused by the ff parameter to 0.99 when srcROUGE$_L$ drops to $$\frac{benchROUGE_L}{2}.$$

There may be very little penalty on ROUGE$_1$ when srcROUGE$_L$ hovers around the document benchmark, and ROUGE$_1$ has a positive correlation with human judgement of paraphrase adequacy.

One or more GPT-2 models executed by paraphrase generation system 42 may output text one token at a time, auto-regressively. For example, GPT-2 models may produce a token using previous tokens as context. For models that use directed text generation, it may be beneficial to keep the input sentence S1 in the context of each token generation step. To fine-tune a model based on a paraphrasing dataset, the paraphrase system 10 may structure the input sequence as [EOS]S1[SEP]S2[EOS], for each paraphrase pair (S1, S2). S1 may represent an original text sample of a set of original text samples 32, and S2 may represent a paraphrase text sample of a set of paraphrase text samples 34. At each time-step, a GPT-2 model may generate a probability distribution over its internal vocabulary based on the token at the previous time step, and the token corresponding to each preceding step. Paraphrase generation system 42 may calculate a loss at each time step by determining a cross-entropy between the probability distribution produced and a one-hot vector of the next token in the sequence.

In some examples, paraphrase system 10 may fine-tune a GPT-2 small model using 110 million parameters and fine-tune a medium GPT-2 model using 345 million parameters for MSR and MSCOCO training datasets. In some examples, paraphrase system 10 may fine-tune models for 10 epochs using a constant learning rate of either 1e-4 or 1e-5 and a weight decay of 0.01. In some examples, processing circuitry 24 of paraphrase system 10 may include a Tesla V100-SXM2-32 GB GPU for this purpose.

Models executed by paraphrase generation system 42 may accept an original text sample structured as [EOS]S1[SEP] as an input. In some examples, a model executed by paraphrase generation system 42 may generate tokens until a pre-decided length is reached. In some examples, a model executed by paraphrase generation system 42 may truncate an output after an [EOS] token is generated. At each step, the model executed by paraphrase generation system 42 may produce a probability distribution over a vocabulary, and the model may select a token from the probability distribution as an output. In some examples, generating one or more text samples based on an original text sample structured as [EOS]S1[SEP] may be referred to herein as "batch generation."

In some examples, paraphrase system 10 may use beam search as a proxy for generating most likely sentences. Paraphrase system 10 may disregard the sentence probabilities and sample individual tokens from the probability distribution at each time-step. In some examples, paraphrase system 10 may use Top-k, Top-p, and temperature scaling to sample tokens effectively from the probability distributions.

Paraphrase generation system 42 may, in some examples, execute a model to generate one or more paraphrase text samples using beam search or by repeating the process of sequential decoding multiple times. Selection metrics may select a paraphrase text sample from the one or more paraphrase text samples. A harmonic mean of $srcROUGE_L$ and $1-srcROUGE_L$ scores for each paraphrase text sample can serve as a selection metric. Equation 5, as shown below, represents one selection metric.

$$\frac{srcROUGE_1 * (1 - srcROUGE_L) * w}{srcROUGE_1 + (1 - srcROUGE_L) * w} \quad (eq. 5)$$

Here the weight w controls how much importance is given to $srcROUGE_1$, with higher w values prioritizing adequacy over novelty. There may be an upper and lower limit on $srcROUGE_L$. There may be a length penalty similar to BLEU.

Paraphrase quality evaluation system 44 may use one or more evaluation metrics (e.g., $ROUGE_P$) to evaluate a quality of a paraphrase text sample based on the paraphrase text sample and the original text sample. In some examples, it may be beneficial for paraphrase quality evaluation system 44 to be evaluated based on adequacy, novelty, fluency and correctness, which are parameters that determine a quality of a paraphrase. $ROUGE_P$, may be more accurate than one or more other metrics for measuring a quality of a paraphrase. There may be a positive correlation between $srcROUGE_L$ and human perceptions of paraphrase quality.

Additionally, or alternatively, it may be possible to calculate BLEU and TER scores corresponding to a paraphrase text sample in order to compare results with one or more other metrics. As described herein, the term "parroting" refers to when a paraphrase text sample is identical to or only slightly different from the respective original text sample. For some datasets, parroting is an important consideration when evaluating a quality if paraphrases, because parroted paraphrases may score highly, even though parroted paraphrases are not useful as paraphrases. Since very high values of $srcROUGE_L$ may correspond to low levels of novelty for paraphrase text samples, paraphrase quality evaluation system 44 may benchmark $srcROUGE_L$ to a value obtained for paraphrases within a dataset. For novelty, paraphrase system 10 may determine an average of an f-measure of $srcROUGE_L$, srcBLEU, and PINC scores for the testing corpus. Although most generations are fluent, perplexity may be used as a proxy for fluency of paraphrases.

In some examples, paraphrase system 10 may use the MSR paraphrase dataset and MSCOCO captions to evaluate an efficacy of one or more paraphrase quality metrics. In some examples, paraphrase system 10 trains and tests the model separately for both of the MSR dataset and the MSCOCO captions. MSR may be a small dataset with very close paraphrases created by scraping off news sources from the web. Paraphrase system 10 may use default test train split, resulting in 2,700 and 1,100 pairs for training and evaluation, respectively. MSCOCO captions may be sizeable and diverse, with multiple references for each input. For fine-tuning, one caption among five is randomly deleted and the model is trained on two pairs formed out of the remaining four. During evaluation, to use multiple references, Paraphrase system 10 may select one caption as the input and use the other four as references for comparison with the model generated paraphrase. Paraphrase system 10 may have 331,000 training pairs and 40,000 sets of five sentences for evaluation in this dataset. For selected results, paraphrase system 10 may randomly sample and use 5% of the test data set in MSCOCO captions.

TABLE 1

| Model | | BLEU | $srcROUGE_1$ | $srcROUGE_L$ | Std. in srcRL | $ROUGE_P$ |
|---|---|---|---|---|---|---|
| S1 and (S2, S3, S4, S5) | | 19.55 | 0.39 | 0.34 | 0.16 | 0.33 |
| GPT-2 small | Greedy | 26.71 | 0.51 | 0.47 | 0.19 | 0.39 |
| | Top-k = 5 | 16.93 | 0.45 | 0.39 | 0.17 | 0.36 |
| | Top-p = 0.95 | 13.64 | 0.41 | 0.36 | 0.16 | 0.34 |
| GPT-2 med | Greedy | 22.36 | 0.47 | 0.43 | 0.17 | 0.38 |
| | Top-k = 5 | 15.7 | 0.42 | 0.37 | 0.16 | 0.35 |
| | Top-p = 0.95 | 14 | 0.40 | 0.35 | 0.16 | 0.34 |

Table 1 shows an effect of greedy, top-k and top-p sampling methods on MSCOCO for GPT-2 small and medium models. These results need to be interpreted in the light of loose nature of paraphrases within the MSCOCO captions dataset. Greedy decoding performs favorably with higher $ROUGE_P$ scores than even the benchmark. Higher $srcROUGE_L$ scores relative to the benchmark might not offset higher unigram overlap of the generated paraphrases with the source.

TABLE 2

| Model | | BLEU | $srcROUGE_1$ | $srcROUGE_L$ | Std. in srcRL | $ROUGE_P$ |
|---|---|---|---|---|---|---|
| S1 and S2 in MSR | | 47.45 | 0.71 | 0.66 | 0.13 | 0.60 |
| GPT-2 small | Greedy | 39.33 | 0.79 | 0.77 | 0.22 | 0.42 |
| | Sampling | 33.64 | 0.70 | 0.67 | 0.23 | 0.46 |
| | Top-k-5 | 34.22 | 0.72 | 0.7 | 0.22 | 0.46 |
| | Top-p = 0.95 | 34.53 | 0.72 | 0.69 | 0.23 | 0.45 |
| GPT-2 med | Greedy | 39.36 | 0.78 | 0.77 | 0.21 | 0.40 |
| | Sampling | 36.52 | 0.74 | 0.72 | 0.22 | 0.45 |
| | Top-k-5 | 36.75 | 0.74 | 0.72 | 0.22 | 0.43 |
| | Top-p = 0.95 | 37.11 | 0.75 | 0.73 | 0.22 | 0.43 |

Table 2 shows an effect of greedy, random, top-k, and top-p sampling methods on MSR for GPT-2 small and medium models. There may be higher values of $srcROUGE_L$ in greedy for both GPT-2 small and medium models indicating partial parroting. This issue may be ameliorated by random, top-k and top-p sampling, but these methods are still plagued by high standard deviation in $srcROUGE_L$ values, indicating inconsistent generation. The metric $ROUGE_P$ is also sensitive parroting because the metric is calculated at a sentence level relative to a corpus-wide benchmark.

Table 1 and Table 2 may show the result of various sampling methods. For example, 'std. in srcRL' stands for a standard deviation of $srcROUGE_L$. The results are for a learning rate of 1e-4 and top-k with k=5 and top-p with p=0:95. In Table 1, the first row represents metrics calculated between paraphrases present in the dataset, with S1 denoting the input that goes into the model, and S2; S3; S4 and S5 being the reference samples. For the first row, BLEU is calculated as multi-reference metrics between S1 and the reference paraphrases. $srcROUGE_1$, std. in srcRL, $srcROUGE_1$ and $ROUGE_P$ are the average of the metrics between each of the reference paraphrases and S1. In Table 2, random sampling helps reduce $srcROUGE_L$, but the standard deviation in $srcROUGE_L$ values is very high for MSR, implying that few sentences are very similar to the input, and few are very further from it. $ROUGE_P$ penalizes sentences with higher $srcROUGE_L$ than the benchmark, resulting in decoding configurations having lower scores despite a high $srcROUGE_1$ or BLEU metric values. For results on MSCOCO captions in Table 1, top-k and top-p sampling bring the $srcROUGE_L$ levels closer to the dataset benchmark, but result in lower adequacy scores on metrics like BLEU and $srcROUGE_1$. $ROUGE_P$ still indicates a higher score for greedy in Table 1 because when $srcROUGE_L$ is higher than the benchmark does not offset the higher unigram overlap.

It may be possible to quantify one or more characteristics of a model output to understand how fine-tuning affects paraphrase generation capabilities. Vocabulary diversity may quantify a capacity of a model to produce lexically diverse paraphrases for a single input under a specified decoding configuration. Vocabulary diversity may include a number of unique tokens together in source, reference and 10 paraphrases sampled from the model divided by the total number of tokens in them.

TABLE 3

| Model | Decoding | BLEU | $srcROUGE_1$ | $srcROUGE_L$ | Std. in srcRL | $ROUGE_P$ |
|---|---|---|---|---|---|---|
| S1 and S2 in MSR | | 47.45 | 0.71 | 0.66 | 0.13 | 0.60 |
| GPT-2 small | Sampling | 33.64 | 0.7 | 0.67 | 0.23 | 0.46 |
| | w = 1.5 | 28.2 | 0.66 | 0.61 | 0.12 | 0.59 |
| | w = 3 | 30.08 | 0.69 | 0.64 | 0.11 | 0.62 |
| GPT-2 med | Sampling | 36.52 | 0.74 | 0.72 | 0.22 | 0.45 |
| | w = 1.5 | 32.7 | 0.69 | 0.65 | 0.14 | 0.57 |
| | w = 3 | 33.79 | 0.72 | 0.68 | 0.13 | 0.59 |

Table 3 shows candidate selection results for the MSR test dataset using a GPT-2 model fine-tuned at a learning rate of 1e-4 for 10 epochs. Filtering using equation 5 may achieve higher $ROUGE_P$ scores consistently across sentences, as shown by the standard deviation in $srcROUGE_L$. It may be possible to generate paraphrases having a desired level of novelty, trading-off adequacy for using the parameter w in the selection metric.

TABLE 4

| Model | Decoding | BLEU | $srcROUGE_1$ | $srcROUGE_L$ | Std. in srcRL | $ROUGE_P$ |
|---|---|---|---|---|---|---|
| S1 and (S2, S3, S4, S5) | | 19.43 | 0.39 | 0.34 | 0.15 | 0.33 |
| GPT-2 small | Sampling | 11.4 | 0.37 | 0.33 | 0.17 | 0.32 |
| | w = 1.5 | 14.78 | 0.5 | 0.46 | 0.16 | 0.43 |
| | w = 3 | 15.46 | 0.51 | 0.47 | 0.17 | 0.44 |
| GPT-2 med | Sampling | 10.88 | 0.38 | 0.33 | 0.17 | 0.32 |
| | w = 1.5 | 14.96 | 0.5 | 0.45 | 0.16 | 0.43 |
| | w = 3 | 15.6 | 0.51 | 0.47 | 0.17 | 0.43 |

Table 4 shows candidate selection results for MSCOCO using GPT-2 fine-tuned at a learning rate of 1e-4 for 5 epochs. Results for MSCOCO may be interpreted in the light of a loose nature of paraphrases within the MSCOCO captions dataset. The $srcROUGE_L$ after filtering may be higher than a baseline, but not very high in absolute terms. $ROUGE_P$ may end up performing better than the baseline better than and random sampling due to more than commensurate increase in unigram overlaps.

TABLE 5

| Model | Decoding | BLEU | $srcROUGE_1$ | $srcROUGE_L$ | Std. in srcRL | $ROUGE_P$ | BLEU |
|---|---|---|---|---|---|---|---|
| S1 and S2 in MSR | | 47.75 | 49.63 | 0.71 | 0.13 | 0.52 | 0.60 |
| GPT-2 small | w = 1.5 | 31.7 | 66.28 | 0.71 | 0.11 | 0.424 | 0.63 |
| | w = 3 | 30.45 | 69.92 | 0.76 | 0.19 | 0.422 | 0.62 |
| GPT-2 med | Sampling | 32.28 | 64.63 | 0.70 | 0.12 | 0.417 | 0.64 |
| | w = 3 | 32.76 | 67.73 | 0.78 | 0.18 | 0.392 | 0.60 |
| GPT-2 small with greedy sampling | | 43.66 | 53.38 | 0.90 | 0.15 | 0.14 | 0.23 |

Table 5 shows normal and reversed paraphrases generated using beam search for MSR. $ROUGE_P$ may perform as expected for challenger paraphrases. Many of the conventional metrics for adequacy and novelty might not respond well to reversed generation. The last row of Table 5 shows that results for GPT-2 are small trained on MSR at a learning rate of 1e-5 for 10 epochs. This generation may mimic the input sentences very closely. $ROUGE_P$ may assign a low score to paraphrases that lack of novelty in them.

Metrics may be used as filters to choose paraphrases with desired properties from the many candidates generated by a model executed by paraphrase generation system 42. Results from such a candidate selection process are shown in Table 3 and Table 4. Ten paraphrase candidates may be generated for each sentence using sampling. Table 3 and Table 4 provide results for two values of w in equation 5, 1.5 and 3. Sampling for MSR in Table 3 results in paraphrases with high variance in quality, which is also reflected in low $ROUGE_P$ scores. Candidate selection helps to not only maintain the consistency of paraphrases that are generated but also facilitates resolving the adequacy-novelty trade-off. Overall, candidate selection yields higher $ROUGE_P$ scores than simple sampling or greedy decoding.

To create challenging paraphrase examples, paraphrase system 5 may generate reversed paraphrases for each of the input sentences from the MSR test dataset. Paraphrase system 10 may use beam search, the results shown in Table 5. Since beam search also involves generation of multiple candidates and their consequent filtering, the results follow a similar pattern as candidate selection after sequential decoding. 'Normal' here refers to paraphrases which are not biased towards a specific goal. A beam size of 20 may, in some cases, be used. Paraphrase system 10 may apply a moving window repetition penalty for beam search, which may be a penalty of 5 for a window of 40 previous tokens. For generating reversed paraphrases, paraphrase system 10 may influence the probability distribution at each step to increase the probability of tokens at the other end of the sentence. This does not conform to a specific linguistic type and it is not necessary that all the samples within the dataset be reversed. For selecting from multiple candidates, paraphrase system may choose the candidate with highest cosine similarity between its embedding of that of the input paraphrase.

Several anomalies exist for the metric scores of reversed paraphrases. Where a higher PINC score indicates more dissimilarity in Table 5, the PINC score stays the same and decreases for reversed paraphrases generated by GPT-2 small and medium respectively, in comparison to 'normal'. The effect of reversing is visible in the $srcROUGE_L$ scores, where reversed paraphrases have a lower $srcROUGE_L$ score with S1. This means that PINC may not accurately quantify novelty for very diverse paraphrases. TER may be used to measure the adequacy of generated paraphrases. Where a lower TER with S2 indicates a better paraphrase match with the reference, results for reversed paraphrases have higher than expected TER, despite having comparable BLEU to 'normal' paraphrases. Edit-based metrics may indicate higher number of edits being required for a very novel paraphrase, which may in fact be better. TER and other edit-based metrics may fail for very novel paraphrase pairs as measures of adequacy, especially when just a single reference is present. $ROUGE_P$ scores are only slightly higher for reversed paraphrases due to the higher variance in novelty despite having a lower mean of $srcROUGE_L$ than normal paraphrases.

The metric $ROUGE_P$ takes the adequacy, novelty and fluency of the generated paraphrase into account, while being easy to use. $ROUGE_P$ addresses a trade-off between adequacy and novelty.

It may be possible to test the robustness of text-classification models using paraphrased inputs and generate specific kinds of paraphrases using language models. Automatic evaluation of the correctness of paraphrases may be possible.

In some examples, "ref" refers to an original text sample and "cand" refers to one or more paraphrase text samples generated by paraphrase generation system 42 using a model and based on an original text sample. In some examples, "gen" refers to the final paraphrase sentence selected from the one or more paraphrase text samples generated based on the original text sample. One or more example metrics may be interpreted at the corpus level and not for individual sentence pairs, which is likewise marked with corpus.

One metric is the Bilingual Evaluation Understudy (BLEU).

$$BLEU_{corpus} = \min\left(1, \exp\left(1 - \frac{ref\ length}{gen\ length}\right)\right) * \left(\prod_{i=1}^{4} precision_i\right)^{0.25} \quad (eq.\ 6)$$

$$precision_i = \frac{\sum_{snt \in gen-corpus} \sum_{i-gram \in snt} count_{clip}(i-gram)}{\sum_{snt \in gen-corpus} \sum_{i-gram \in snt} count_{gen}(i-gram)} \quad (eq.\ 7)$$

$$count_{clip} = \min(count_{gen}, count_{ref}) \quad (eq.\ 8)$$

The first part of $BLEU_{corpus}$ may represent the brevity penalty and the second part may represent the geometric mean of modified n-gram precision scores. When there are multiple references, the closest reference in length may be used to calculate the brevity penalty and the count may be clipped at the maximum count of the i-gram in a single reference.

Another metric is the Metric for Evaluation for Translation with Explicit Ordering (METEOR). Unigram mapping (e.g., alignment) between two strings may be created using exact, porter stem and synonymy. Based on the word mapping, a parametrized harmonic mean of unigram precision and recall may be calculated.

$$F_{mean} = \frac{PR}{\alpha P + (1-\alpha)R} \quad (eq.\ 8)$$

$$P = \frac{Mapped\ unigrams}{Unigrams\ in\ gen} \quad (eq.\ 9)$$

$$R = \frac{Mapped\ unigrams}{Unigrams\ in\ ref} \quad (eq.\ 10)$$

$$METEOR = (1-Pen) * F_{mean} \quad (eq.\ 11)$$

where Pen is the alignment penalty

For Multiple References $$METEOR_{multi} = \max_i(METEOR(reference_i, candidate)) \quad (eq.\ 12)$$

Another metric is the Recall Oriented Understudy for Gisting Evaluation (ROUGE).

$$ROUGE_N = \frac{\sum_{snt \in gen-corpus} \sum_{n-gram \in snt} count_{match}(n-gram)}{\sum_{snt \in ref-corpus} \sum_{n-gram \in snt} count_{ref}(n-gram)} \quad (eq.\ 13)$$

$ROUGE_N$ may be an n-gram recall between a candidate and a set of references.

$$ROUGE_L = F_{LCS} = \frac{(1+\beta^2)R_{LCS}P_{LCS}}{R_{LCS} + \beta^2 P_{LCS}} \quad (eq.\ 14)$$

$$R_{LCS} = \frac{LCS(gen, ref)}{Len(ref)} \quad (eq.\ 15)$$

$$P_{LCS} = \frac{LCS(gen, ref)}{Len(gen)} \quad (eq.\ 16)$$

LCS may be the longest common subsequence and Len is the length function.

For Multiple References $$ROUGE_{multi} = \max_i(ROUGE(reference_i, candidate)) \quad (eq.\ 17)$$

Another metric may be Paraphrase In N-gram Changes (PINC). PINC may be a measure of lexical dissimilarity and may be calculated as the number of n-gram differences between the candidate and reference.

$$PINC = \frac{1}{N}\sum_{n=1}^{N} 1 - \frac{|n-gram_{ref} \cap n-gram_{gen}|}{|n-gram_{gen}|} \quad (eq.\ 18)$$

Candidates may be rewarded for introducing new n-grams but not for omitting n-grams from the reference sentence.

Another metric may be Paraphrase Evaluation Metric (PEM). PEM may be a metric based on adequacy, fluency and lexical dissimilarity. Adequacy may be calculated independent of lexical (n-gram) similarity and fluency may be calculated as $$P_n = \frac{\log Pr(s)}{length(s)}$$

where Pr(S) may be sentence probability predicted by a standard 4-gram language model. The three components may be combined using SVM with radial basis function (RBF) kernel trained on human-judged paraphrase pairs.

Another metric is Translation Edit Rate (TER). A minimum number of edits may be required to change a candidate into one of the references, normalized by the average length of the reference. One or more edits such as insertion, deletion, shifts, and substitution may have equal cost.

$$TER = \frac{Num\ of\ edits}{Avg\ number\ of\ ref\ words} \quad (eq.\ 19)$$

There may also be embedding based metrics. In some cases, paraphrase system 10 may calculate cosine similarity between candidate and reference sentence embedding. There may be one or more ways to calculate sentence embeddings. An example word embedding average is $$e_C = \frac{\sum_{w \in C} e_W}{\left|\sum_{w \in C} e_W\right|}.$$

Paraphrase system 10 may apply sentence embedding using a language model such as BERT.

GPT-2 may be trained in an unsupervised manner on a dataset of 8 million webpages for the task of next word prediction. GPT-2 may be adept at generational tasks. GPT-2 may represent a decoder only transformer and comes in small, medium, large, and extra-large sizes, where the embedding dimension and the number of decoder blocks stacked over each other may vary. Each decoder block may consist of a masked self-attention layer and a feed-forward neural network layer. The mask in the attention layer may be used to attend on tokens to the left, making the model unidirectional (e.g., left-to-right). The term "token" may refer to words or sub-words the input sentence is split into using byte-pair encoding.

Output text in GPT-2 may be produced one token at a time, auto-regressively; that is, at each time step a token may be produced using previous tokens as context. In some examples, text generation from language models can either be open-ended or directed, where the latter may imply an output that is a constrained transformation of the input. For directed generation, it may be beneficial to keep an input sentence in the context of each token generation step. Since GPT-2 may represent a decoder only model, paraphrase system 10 may provide the input sentence directly to the decoder for context. In some examples, to fine-tune the model on a paraphrasing dataset, for each paraphrase pair (S1, S2), it is possible to input S1 into the model to generate S2.

An example alternative to maximization-based decoding is to sample individual tokens from the distribution at each time step while disregarding the sentence probability. One or more techniques may improve chances of sampling the correct words by modifying the underlying probability distribution, both for beam search and for sequential sampling of tokens.

One or more techniques may modify a probability distribution generated by the model to increase a chance of a randomly picked token being desirable.

One sampling technique is Top-k. Before sampling, k tokens with the highest probability may be picked, and the resulting distribution is renormalized. The output token may be sampled from this new distribution. Greedy may represent Top-k with k=1.

$$p' = \sum_{y_i \in V(k)} P(y_i | y_{1:i-1}, x_{1:m}) \quad \text{(eq. 20)}$$

P may represent the generated probability distribution for an input $x_{1:m}$ at step i, and V (k) may represent the set of k tokens which maximize p'. The new distribution P' may be given by the following equation.

$$P'(y_i | y_{1:i-1}, x_{1:m}) = \frac{P(y_i | y_{1:i-1}, x_{1:m})}{p'} \text{ if } y_i \in V(k), \text{ else } 0 \quad \text{(eq. 21)}$$

Another sampling technique is Top-p. Top-p is similar to top-k, except that k might not be fixed for Top-p and k may be decided based on the minimum number of tokens needed to reach the desired cumulative probability cut-off. This may remove the fat-tail from the distribution, preventing the model from sampling tokens that have very low probability.

$$V(p) \text{ is the smallest set such that } \sum_{y_i \in V(p)} P(y_i | y_{1:i-1}, x_{1:m}) \geq p, \quad \text{(eq. 22)}$$

$$\text{then } p' = \sum_{y_i \in V(p)} P(y_i | y_{1:i-1}, x_{1:m}) \quad \text{(eq. 23)}$$

Temperature scaling is another kind of sampling technique. In some examples, the distributions generated by the model are sharp with very few tokens of high probability. In some cases, a diversity of the text produced will be low. To tackle that problem, the distribution can be flattened using temperature scaling with a factor of $T \in (0,1]$.

$$P'(y_i | y_{1:i-1}, x_{1:m}) = \frac{\exp\left(\frac{P(y_i | y_{1:i-1}, x_{1:m})}{T}\right)}{\sum_j \exp\left(\frac{P(y_j | y_{1:j-1}, x_{1:m})}{T}\right)} \quad \text{(eq. 24)}$$

Another sampling technique is repetition penalty. GPT-2 models may have a tendency to repeat words or phrases that previously occur. This may manifest as the probability of previously occurring tokens being unnaturally high in the distributions produced. Probability system 10 may apply a penalty to the probability of tokens which occur previously or within a specific window. The modified distribution may be determined using the following equation.

$$P'(y_i | y_{1:i-1}, x_{1:m}) = \frac{P(y_i | y_{1:i-1}, x_{1:m})}{p'}, \quad \text{(eq. 25)}$$

where p'=R if $y_i \in y_{i-w-1:i-1}$, else 1. (eq. 26)

The parameter R may be the penalty applied on window of size w.

Table 6 shows some samples for the MSCOCO captions dataset generated using greedy and Top-p decoding. Table 7 and Table 8 show sample generation for the MSR dataset using greedy sampling and top-p sampling followed by candidate selection respectively. Clear distinction can be made in the level of novelty between both the generation settings. Reversed and shortened paraphrase samples for MSR are shown in Table 9 and Table 10 respectively.

Table 6 includes paraphrase samples for MSCOCO generated using a GPT-2 model with greedy and top-p sampling. MSCOCO captions may include a dataset of 5 sentence sets, describing the same image, considered as paraphrases. The amount of variation within the dataset is significantly higher than the amount of variation within the MSR dataset.

TABLE 6

| Input | Ref1 | Ref2 | Ref3 | Ref4 | Greedy | Top-p |
|---|---|---|---|---|---|---|
| a biker with a helmet on is standing behind two motorcycles | a man in a helmet is standing beside two parked motorcyced | a guy with a helmet on stands next to a motorcycle | a man is standing next to two motorcycles | a picture of a person in leather and helmet standing behind two motorcycles | a man standing next to a motorcycle in a parking lot | a man standing next to two motorcycles |
| a crowd of people walking down a street next to a traffic light | many people stand at a street corner together | a busy city intersection filled with people walking | a large crowd of people standing an a street | a crowded street corner blocked off by street cones | a crowd of people walking down a street | a view of people on the street during a traffic competition |
| a 787 jet airplane sitting on a runway at an airport | a fence sits around a plane on a runway | a white and blue 787 plane at the airport | a commercial jetliner on a runway at an airport | a blue and white large body plane on the runway | a large jetliner sitting on top of an airport tarmac | a white jetliner taking off from an airport |

Table 7 includes paraphrase samples for MSR generated using a GPT-2 model with greedy sampling. Large portions of input sentences may be common in generated sentences, which may be referred to herein as "partial parroting." In such generation settings, one or more sentences may be found that are exact replicas of the input sentence.

TABLE 7

| Input paraphrase S1 | Reference paraphrase S2 | Generated paraphrase |
|---|---|---|
| But skeptics are concerned about the ease with which vendors can use these hardware-based security features to set digital rights management policies. | But skeptics are concerned about the ease at which these hardware-based security features could be used to set digital rights management policies by vendors. | But skeptics are concerned about the ease with which vendors can use these hardware-based security features to set digital rights management policies. |
| The company added, "until more facts are presented, Lindows.com will not take a position as to the validity of the claims presented by either side." | "Until more facts are presented, Lindows.com will not take a position as to the validity of the claims presented by either side," Lindows said in a statement. | "Lindows.com will not take a position as to the validity of the claims presented by either side," the company said. |
| Dotson was arrested July 21 after calling 911, saying he needed help because he was hearing voices, authorities said. | Authorities picked up Dotson on July 21 after he called 911, saying he needed help because he was hearing voices, authorities said. | Dotson, 31, was arrested July 21 after calling 911 and saying he needed help because he was hearing voices, authorities said. |

Table 8 includes samples for MSR generated using a GPT-2 model with candidate selection and Top-p. Sampling with Top-p helps add more relevant diversity to paraphrase generation. Candidate selection may help to filter sentences having a desired level of novelty from the input sentence.

TABLE 8

| Input paraphrase S1 | Reference paraphrase S2 | Generated paraphrase |
|---|---|---|
| But skeptics are concerned about the ease with which vendors can use these hardware-based security features to set digital rights management policies. | But skeptics are concerned about the ease at which these hardware-based security features could be used to set digital rights management policies by vendors. | Some security experts question the ease with which vendors can use these security features to set digital rights management policies. |
| The company added, "until more facts are presented, Lindows.com will not take a position as to the validity of | "Until more facts are presented, Lindows.com will not take a position as to the validity of the claims | Lindows.com said "until more facts are presented," it won't take a position on the validity of the claims |

TABLE 8-continued

| Input paraphrase S1 | Reference paraphrase S2 | Generated paraphrase |
| --- | --- | --- |
| the claims presented by either side." | presented by either side," Lindows said in a statement. | presented by either side. |
| Dotson was arrested July 21 after calling 911, saying he needed help because he was hearing voices, authorities said. | Authorities picked up Dotson on July 21 after he called 911, saying he needed help because he was hearing voices, authorities said. | Dotson, 30, told investigators he needed help because he was hearing voices, authorities said. |

Table 9 includes reversed paraphrases for MSR generated using a GPT-2 model with beam search and greedy sampling. Examples shown here may be cherry-picked and without sentences being reversed.

TABLE 9

| Input paraphrase S1 | Reference paraphrase S2 | Generated paraphrase |
| --- | --- | --- |
| According to Tuesday's report, consumers' assessment of current conditions was less favourable than a month earlier. | Consumers' assessment of current conditions was less favorable than last month. | Consumers' assessment of current conditions was less favourable than a month earlier, the report said. |
| In September, Hewlett-Packard signed a development and marketing deal with the company. | Four months later it signed a joint marketing agreement with Hewlett-Packard Co. | In late September, the company signed a development and marketing deal with Hewlett-Packard. |
| Clijsters was simply too complete and powerful for the Spanish veteran Conchita Martinez in her quarterfinal, winning, 6-2, 6-1. | Clijsters was simply too powerful for Spanish veteran Conchita Martinez, winning 6-2, 6-1. | The 6-2, 6-1 performance by Clijsters in her quarterfinal against the Spanish veteran Conchita Martinez was simply too complete and powerful to overcome. |

Table 10 includes shortened paraphrase samples for MSR generated using a GPT-2 model with beam search and greedy sampling. Here, beams may be penalized if their length exceeds a certain percentage of the input sentence.

TABLE 10

| Input paraphrase S1 | Reference paraphrase S2 | Generated paraphrase |
| --- | --- | --- |
| According to Tuesday's report, consumers' assessment of current conditions was less favourable than a month earlier. | Consumers' assessment of current conditions was less favorable than last month. | Consumers' assessment of current conditions was also less favourable than a month earlier. |
| In September, Hewlett-Packard signed a development and marketing deal with the company. | Four months later it signed a joint marketing agreement with Hewlett-Packard Co. | H-P entered into a development and marketing agreement with the company. |

Paraphrase generation system 42 may, in some cases, execute a paraphrase model (e.g., GPT-2) to generate one or more paraphrases corresponding to each original text sample of the set of original text samples 32. Paraphrase quality evaluation system 44 may use a single metric described herein (e.g., $ROUGE_P$) to evaluate a quality of paraphrases generated by paraphrase generation system 42. Evaluating the quality of auto-generated paraphrases may be beneficial so that one or more paraphrase generation models executed by paraphrase generation system 42 can be tested for robustness. In some examples, paraphrase system 10 may re-train or otherwise adjust the one or more paraphrase generation models executed by the paraphrase generation system 42 if the quality of paraphrases generated by the one or more paraphrase generation models is not adequate.

In some examples, a paraphrase generation model executed by paraphrase generation system 42 may generate one or more paraphrases for input to another model (e.g., a text classification model executed by paraphrase quality evaluation system 44) such that paraphrase quality evaluation system 44 may, at least in part, test a robustness of the paraphrase generation model by testing a quality of paraphrases generated by the paraphrase generation model. The text classification model may represent a model configured to classify a quality of one or more paraphrases generated by paraphrase generation system 42 using the single metric (e.g., $ROUGE_P$). By classifying one or more paraphrases generated by paraphrase generation system 42 using the single metric, paraphrase quality evaluation system 44 may be configured to associate each paraphrase generated by paraphrase generation system 42 with a quality level as indicated by the single metric.

Paraphrase system 10 may re-train or otherwise adjust the one or more paraphrase generation models executed by the paraphrase generation system 42 using the one or more paraphrases that are classified by the paraphrase generation system 42 using the single metric. That is, paraphrases that are classified by paraphrase quality evaluation system 44 may be added to a set of training data that is used to re-train the one or more paraphrase generation models executed by the paraphrase generation system 42. Since the single metric indicates a quality of each paraphrase generated by the one or more paraphrase generation models, paraphrase system 10 may re-train the one or more paraphrase generation models based on identifying one or more patterns common to paraphrases that are classified as being high-quality by the paraphrase quality evaluation system 44 and based on identifying one or more patterns common to paraphrases that are classified as being low-quality by the paraphrase quality evaluation system 44. In this way, paraphrase system 10 may improve the one or more paraphrase generation models executed by the paraphrase generation system 42 by re-training the one or more paraphrase generation models to consistently generate paraphrases having characteristics common to high-quality paraphrases previously generated by the one or more paraphrase generation models, and to consistently avoid generating paraphrases having characteristics common to high-quality paraphrases previously generated by the one or more paraphrase generation models. Paraphrase system 10 may, in some cases, continuously re-train the one or more paraphrase generation models executed by the paraphrase generation system 42 using paraphrases generated by the one or more paraphrase generation models and classified by the paraphrase quality evaluation system 44 using the single metric.

In some cases, metric values calculated by the paraphrase quality evaluation system 44 may be used to generate a training set of high-quality paraphrases to train one or more paraphrase models executed by paraphrase generation system 42. The paraphrase quality evaluation system 44 is not limited to evaluating auto-generated paraphrases. The paraphrase quality evaluation system 44 may use the single metric to evaluate a quality of any paraphrase, including a paraphrase written by a human. The paraphrase generation system 44 may, in some examples, select one paraphrase for evaluation from a set of candidate paraphrases each generated based on the same original text. Training data used to train, re-train, otherwise or otherwise adjust the one or more paraphrase generation models executed by the paraphrase generation system 42 is not limited to auto-generated paraphrases classified by paraphrase quality evaluation system 44 using the single metric. The training data may additionally or alternatively include one or more paraphrases written by humans that are classified by paraphrase quality evaluation system 44 using the single metric.

In some examples, memory 26 may store a set of training data for training, re-training, or otherwise adjust the one or more paraphrase generation models executed by the paraphrase generation system 42. In some examples, the set of training data may include a set of training data paraphrases, wherein each training data paraphrase of the set of training data paraphrases is associated with a single metric (e.g., $ROUGE_P$) that indicates a quality of the respective paraphrase. That is, the set of training data may include paraphrases across a spectrum of quality. Paraphrase system 10 may train the one or more paraphrase generation models executed by the paraphrase generation system 42 based on the set of training data. For example, since each training data paraphrase of the set of training data paraphrases is associated with a single metric (e.g., $ROUGE_P$) that indicates a quality of the respective paraphrase, paraphrase system 10 may identify, by training the one or more paraphrase generation models, one or more patterns associated with high-quality paraphrases and one or more patterns associated with low-quality paraphrases. Based on these identified patterns, the trained one or more paraphrase generation models may be improved to generate paraphrases having quality that is higher as compared with systems that do not train paraphrase generation models using training paraphrases classified by a single metric indicating a quality of each paraphrase.

In some examples, memory 26 is configured to store a set of testing data including one or more paraphrase text samples of the set of paraphrase text samples 34 and one or more paraphrase quality metrics of the set of paraphrase quality metrics 36. The one or more paraphrase text samples of the set of testing data are generated by a paraphrase generation model executed by paraphrase generation system 42. Each paraphrase quality metric of the one or more paraphrase quality metrics of the set of testing data may indicate a quality of a respective paraphrase text sample of the one or more paraphrase text samples. This means that the set of testing data may indicate a quality of paraphrase text samples generated using the paraphrase generation model. Paraphrase system 10 may, in some examples, test an ability of the paraphrase generation model executed by paraphrase generation system 42 to generate quality paraphrases.

Since each paraphrase quality metric of the one or more paraphrase quality metrics of the set of testing data may indicate a quality of a respective paraphrase text sample of the one or more paraphrase text samples, paraphrase system 10 may test the ability of the paraphrase generation model to generate quality paraphrases by evaluating the one or more paraphrase quality metrics of the set of testing data. In some examples, paraphrase system 10 may test the ability of the paraphrase generation model to generate quality paraphrases by calculating a mean of the one or more paraphrase quality metrics of the testing data. In some examples, paraphrase system 10 may test the ability of the paraphrase generation model to generate quality paraphrases by calculating a median of the one or more paraphrase quality metrics of the testing data. In some examples, paraphrase system 10 may test the ability of the paraphrase generation model to generate quality paraphrases by calculating one or more other parameters based on the one or more paraphrase quality metrics of the testing data. Paraphrase system 10 may, in some examples, determine that the paraphrase generation model needs to be re-trained or otherwise adjusted to improve a quality of paraphrases generated by the model if the one or more paraphrase quality metrics of the testing data do not exceed a quality metric threshold.

In some examples, when paraphrase generation system 42 executes a paraphrase generation model to generate a paraphrase text sample, paraphrase quality evaluation system 44 may generate a paraphrase quality metric corresponding to the paraphrase text sample. Paraphrase system 10 may save the paraphrase text sample and the paraphrase quality metric to the set of testing data corresponding to the paraphrase generation model. In other words, paraphrase system 10 may collect one or more paraphrase text samples generated by the paraphrase generation model and paraphrase quality metrics associated with the one or more paraphrase text samples in the same set of testing data. The set of testing data thus indicates the quality of one or more paraphrase text samples generated by the paraphrase generation model, such that paraphrase system 10 may test an ability of the paraphrase generation model to generate quality paraphrases.

In some examples, memory 26 is configured to store a set of training data including one or more paraphrase text samples of the set of paraphrase text samples 34 and one or more paraphrase quality metrics of the set of paraphrase quality metrics 36. In some examples, each paraphrase text sample of the one or more paraphrase text samples may correspond to a paraphrase quality metric of the one or more paraphrase quality metrics. Paraphrase system 10 may use the set of training data to train a paraphrase generation model that is executed by paraphrase generation system 42. In some examples, paraphrase system 10 may continuously update the set of training data to include additional pairings of paraphrase text samples and paraphrase quality metrics. As the set of training data is updated, paraphrase system 10 may periodically re-train one or more paraphrase generation models executed by paraphrase generation system 42.

Figure 2:
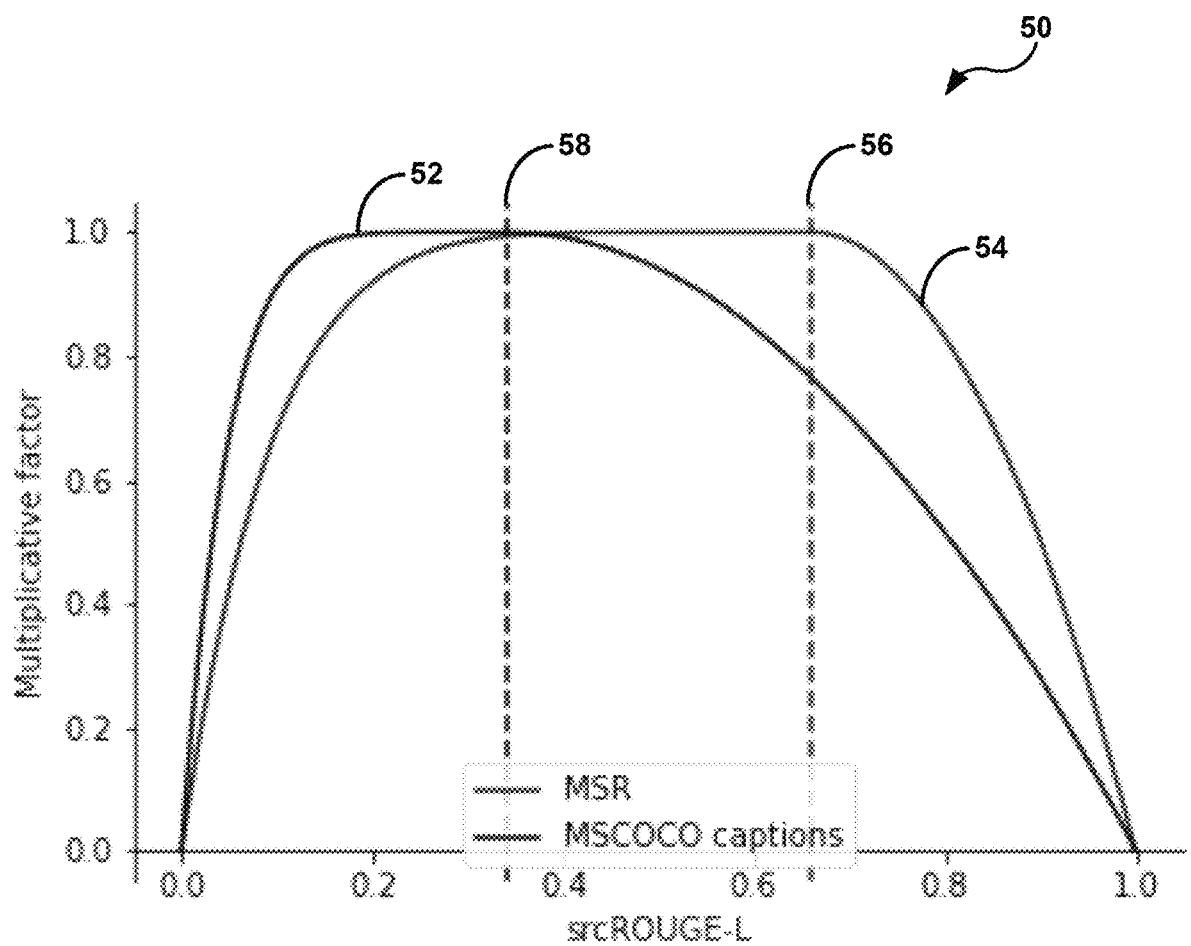
FIG. 2 is a conceptual diagram illustrating a plot of srcROUGE$_L$ values for paraphrase text samples corresponding to two different paraphrase generation models, in accordance with one or more techniques of this disclosure.

FIG. 2 is a conceptual diagram illustrating a plot 50 of $srcROUGE_L$ values for paraphrase text samples corresponding to two different paraphrase generation models, in accordance with one or more techniques of this disclosure. Plot 50 may demonstrate how the nf parameter and the ff parameter change based on dataset benchmarks (e.g., $benchROUGE_L$). In some examples, the metric $ROUGE_P$ is calculated as average of individual sentence values of the metric.

Plot 50 includes a first plot 52 of the novelty and fluency scores for a range of values of $srcROUGE_L$ for a first set of paraphrases generated by a first paraphrase generation model (e.g., MSCOCO). Plot 50 includes a second plot 54 of the novelty and fluency scores for a range of values of $srcROUGE_L$ for a second set of paraphrases generated by a second paraphrase generation model (e.g., MSR). Plot 50 includes a first dotted line 56 which indicates $benchROUGE_L$ for the first set of paraphrases generated by the first paraphrase generation model. Plot 50 includes a second dotted line 58 which indicates $benchROUGE_L$ for the second set of paraphrases generated by the second paraphrase generation model. In some examples, the novelty and fluency factors may be inactive when the $srcROUGE_L$ value is lower than the $benchROUGE_L$ value for the respective paraphrase generation model. The β parameter of equation 1 may be a constant number (e.g., 2) to limit a penalization for the initial 10% of the remaining range of $srcROUGE_L$ values greater than the respective $benchROUGE_L$ value. In some examples, the γ parameter of equation 2 is a constant number (e.g., 7) so that the fluency score penalizes for non-fluency only when $srcROUGE_L$ drops below the 50% mark of the respective $benchROUGE_L$ value.

Figure 3:
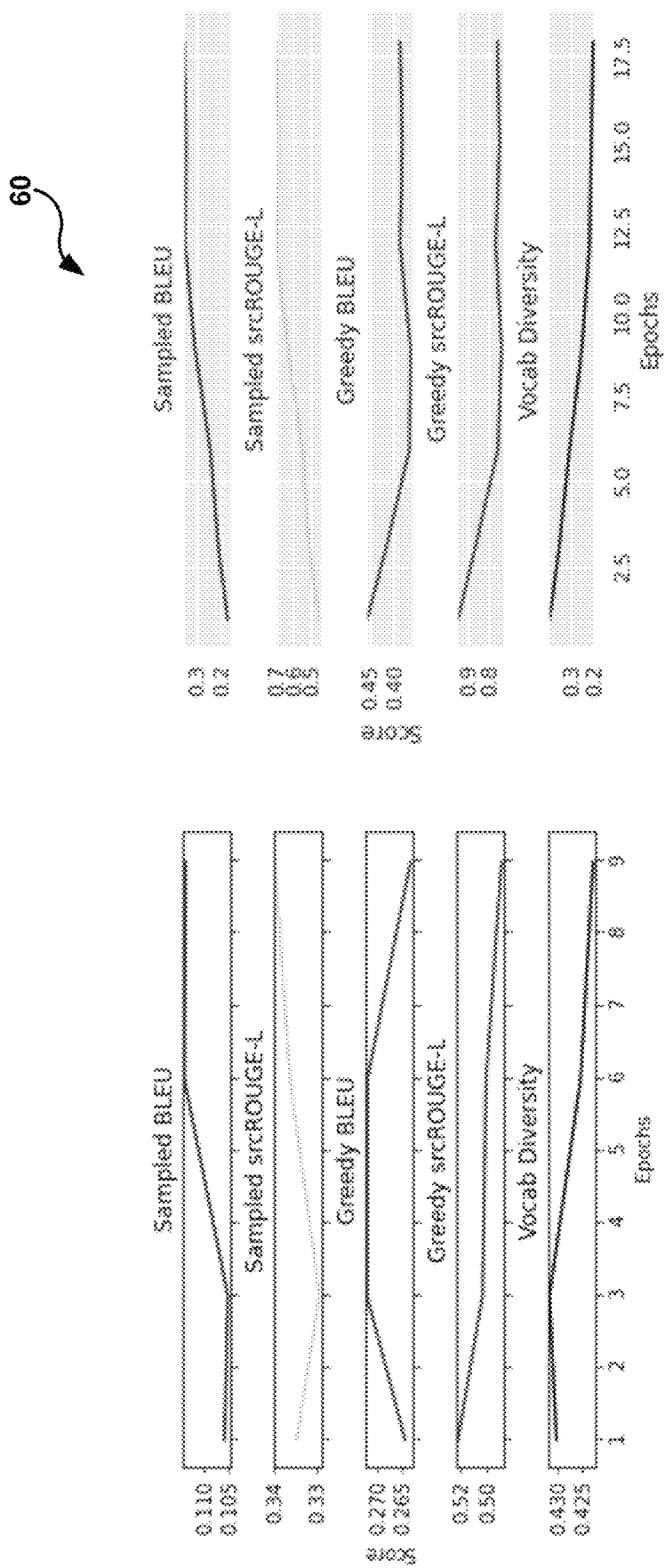
FIG. 3 is a conceptual diagram including a set of plots that show a variation of one or more metrics based on a number of epochs, in accordance with one or more techniques of this disclosure.

FIG. 3 is a conceptual diagram including a set of plots 60 that show a variation of one or more metrics based on a number of epochs, in accordance with one or more techniques of this disclosure. For example, FIG. 3 shows a variation in test metrics with the number of epochs a GPT-2 is fine-tuned for on MSCOCO (left) and MSR (right). Greedy sampling results of the model may be an indicator of what the model has learned during its fine-tuning. Greedy $srcROUGE_L$ may drop from much higher than the benchmark as the training progresses, implying that the model is shedding its tendency to parrot. Vocabulary diversity also dips as the model is fine-tuned further to generate sharper distributions. Note that metrics for sampled generation improve with further fine-tuning.

The results in FIG. 3 may be obtained for a GPT-2 model fine-tuned with a learning rate of 1e-4 and evaluated on MSCOCO captions and MSR. As shown by the $srcROUGE_L$ curves for greedy selection, training may help the model avoid parroting. The fine-tuning trade-off with adequacy is that a model may lose its capacity to generate diverse paraphrases for an input sentence as the distribution sharpens, as shown by the downward diversity curves in FIG. 2. Such a metrics-based analysis may set a stopping criterion for fine-tuning, balancing the required adequacy and diversity in the generated paraphrases. Diversity may increase with temperature scaling of generated distributions, which may sometimes yield higher adequacy scores for the same diversity.

As seen in FIG. 3, the paraphrase model may parrot an input sentence if not fine-tuned properly. The model may be developed to handle challenging examples where the generated paraphrases are very similar to the input sentences. This is evident from the $srcROUGE_L$ scores for the last row in Table 5. BLEU and TER indicate high quality paraphrases, which is not the case. $ROUGE_P$ correctly assigns a very low score, because the novelty score penalizes unigram overlap. $ROUGE_P$ may interpret adequacy of paraphrases in light of their novelty.

FIG. 4 is a conceptual diagram illustrating an input 62 to a paraphrase generation model for fine-tuning a paraphrase generation model, in accordance with one or more techniques of this disclosure. As seen in FIGS. 4, S1 and S2 are separated by a special token-[SEP]. The whole structure may be surrounded by an [EOS] token, and excess length may be filled by an [PAD] token. GPT-2 may start from a first token of the sequence shown in FIG. 4 and auto-regressively attempt to predict the next token in the sequence. Future tokens may be hidden using masking. At each time-step, GPT-2 may generate a probability distribution over an internal vocabulary based on the token at the previous time step, and based on preceding tokens. Paraphrase system 10 may calculate a loss at each time step as a cross-entropy between the probability distribution and a one-hot vector of the next token in the sequence. In cases where paraphrase system 10 fine-tunes the model to predict S2 based on S1, it may be beneficial to discount loss arising from the predictions before the [SEP] token.

Input 62 may represent an input structure for fine-tuning a model. Padding may be accomplished on the right and may not be attended upon by the model. [PAD] may be set as the same as the [EOS] token. The [SEP] token may be added to the model vocabulary and may be fine-tuned along with other token embeddings.

Figure 5:
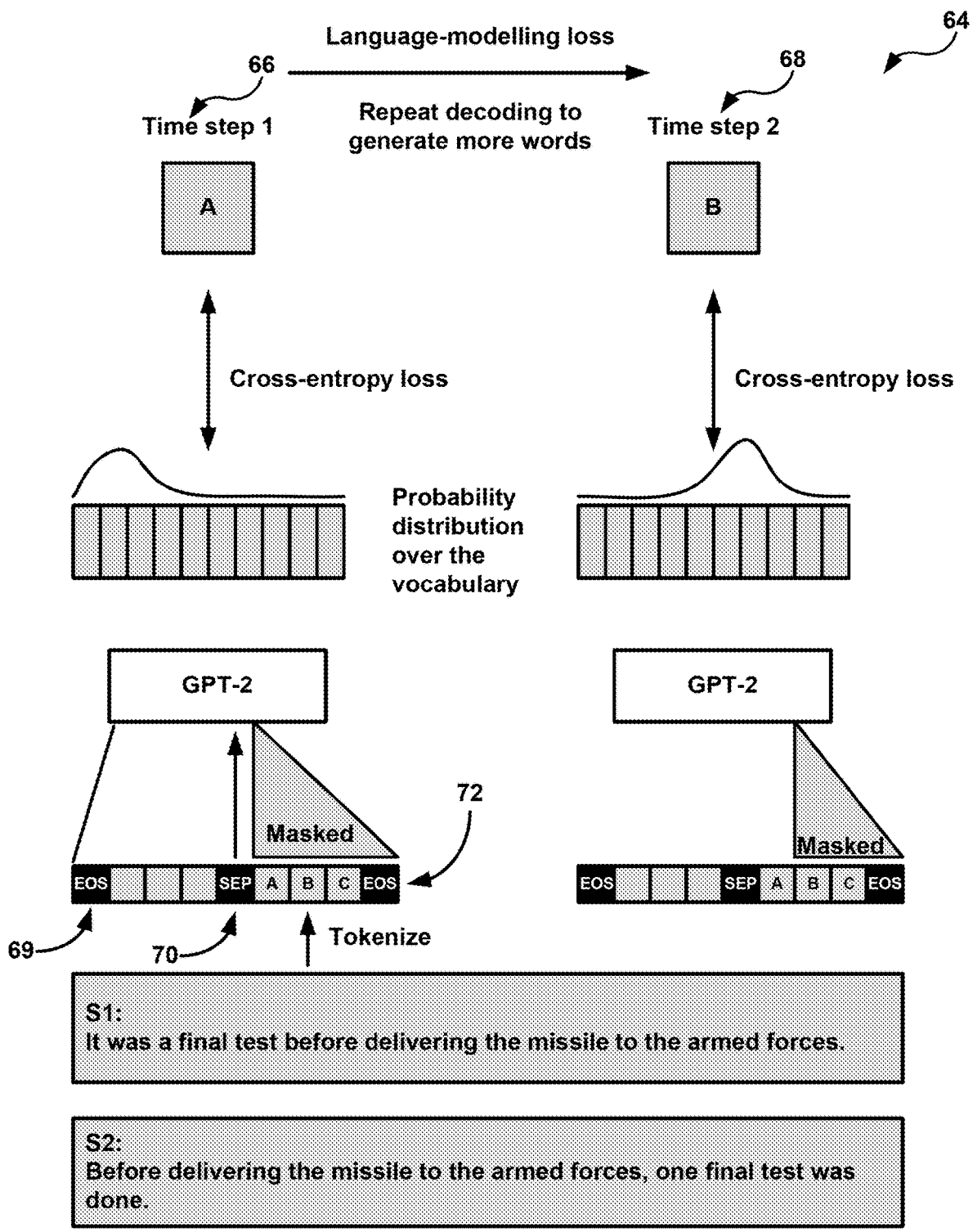
FIG. 5 is a conceptual diagram illustrating a set of two time steps 64 that may occur when fine-tuning a GPT-2 paraphrase generation model based on maximum likelihood estimation, in accordance with one or more techniques of this disclosure.

FIG. 5 is a conceptual diagram illustrating a set of two time steps 64 that may occur when fine-tuning a GPT-2 paraphrase generation model based on maximum likelihood estimation, in accordance with one or more techniques of this disclosure. In some examples, the GPT-2 paraphrase generation model of FIG. 5 represents a paraphrase generation model configured to be executed by paraphrase generation system 42 of FIG. 1. The set of two time steps 64 may include a first time step 66 and a second time step 68 that represent a pair of consecutive time steps within a sequence of time steps that extends from a first [EOS] token 69 to a second [EOS] token 72. As seen in FIG. 5, the first time step 66 corresponds to the "A" token, and the second time step 68 corresponds to the "B" token, where the "A" token is the first token following [SEP] token 70, and where the "B" token is the second token following [SEP] token 70. At any given time step of the sequence of time steps, a model may predict a next token of the sequence of tokens shown in FIG. 4, starting from the first time step. Time steps 64 include two time steps after the model reaches an [SEP] token 70. A loss may accumulate from an [SEP] token 70 until the second [EOS] token 72 occurs in a sequence. The process may continue for a predetermined number of tokens (e.g., 100 tokens).

FIG. 5 illustrates the set of two time steps 64 of a process for training a GPT-2 paraphrase generation model. A tokenized form of an output sentence (e.g., a paraphrase text sample) is written as "ABC." At the second time step 68, the model may take all tokens preceding token "B" as an input (including token "A") and produce token "B" as an output. At a third time step following second time step 68, the model may take all tokens preceding token "C" as an input (including token "A" and token "B") and produce token "C" as an output. In this way, the model proceeds through the sequence of time steps in order from the time step corresponding to the first [EOS] token 69 to the time step corresponding to the second [EOS] token 72.

Paraphrase system 10 may calculate a loss at the second time step 68 as the cross-entropy between the probability distribution and a one-hot vector of token "B" in the model vocabulary.

$$P(y_{1:n}) = \prod_{i=1}^{n} P(y_i | y_{1:i}, x_{1:m}) \qquad \text{(eq. 27)}$$

Where $x_{1:m}$ are the input sentence tokens and $y_{1:n}$ are the output sentence tokens. A loss at time step "t" may be calculated using the following equation.

$$\text{Loss}_t = -\sum_{i=1}^{len(V)} \hat{y}_i \log(P_t(y_i)) \qquad \text{(eq. 28)}$$

The parameter $\hat{y}$ may represent a one-hot vector of an expected token and len(V) may represent a length of a model vocabulary. This may reduce to $\text{Loss}_t = -\log(P_t(k))$, where "k" is an expected token index at time "t."

FIG. 6 is a conceptual diagram illustrating an input 74 for performing batch generation using a GPT-2 paraphrase generation model, in accordance with one or more techniques of this disclosure. Padding may be done on the left so that [SEP] tokens align on the right for synchronous batch generation. The GPT-2 model may recognize a pattern of [EOS]S1[SEP] from fine-tuning, as seen in FIG. 4. In some examples, paraphrase generation system 42 of FIG. 1 may be configured to perform batch generation using input 74 of FIG. 6 to generate one or more paraphrase text samples.

Generating paraphrases for an input sentence may follow a pattern that is similar to a pattern for fine-tuning the model. Since each input sentence may have a different length, paraphrasing system 10 may pad sentences on the left for batch generation. Fine-tuning may train the model to generate a paraphrase for S1 when the model recognizes an [SEP] following S1. At each step, the model may produce a probability distribution based on a vocabulary, and sample a token as an output.

Figure 7:
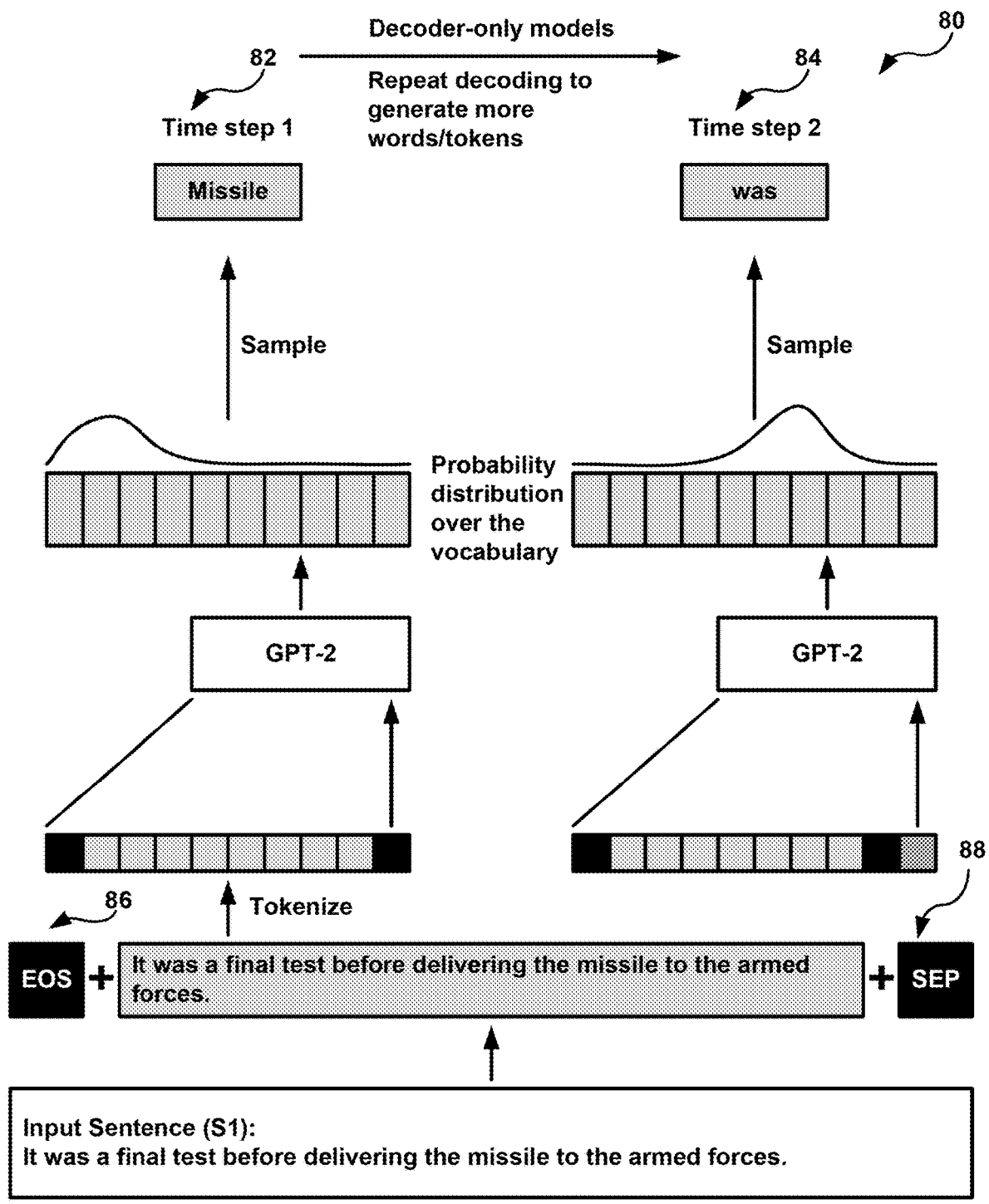
FIG. 7 is a conceptual diagram illustrating a set of time steps for generating a paraphrase using a GPT-2 paraphrase generation model, according to one or more techniques of this disclosure.

FIG. 7 is a conceptual diagram illustrating a set of time steps 80 for generating a paraphrase using a GPT-2 paraphrase generation model, according to one or more techniques of this disclosure. In some examples, the GPT-2 paraphrase generation model of FIG. 7 represents a paraphrase generation model configured to be executed by paraphrase generation system 42 of FIG. 1. As seen in FIG. 7, the set of time steps 80 includes a first time step 82 and a second time step 84. In some examples, the set of time steps 80 represents a set of consecutive time steps of a sequence of time steps. The set of time steps 80 may be for sequential decoding, and might not be for beam search. A token may be sampled at each time step from a generated probability distribution over a vocabulary of the model. A token generated at a time step of time steps 68 may be appended to the input of the next time stamp. In some examples, the process may be halted if an [EOS] token is encountered or when a predetermined number of tokens (e.g., 50 tokens) is reached.

As shown in FIG. 7, after the "Missile" token is generated in first time step 82, the "Missile" token may be appended to the input of the model at the second time step 84. At the second time step 84, the model may generate the "was" token which follows the "Missile" token. In this way, when the model tokenizes the sentence "It was a final test before delivering the missile to the armed forces" to generate a paraphrase, the paraphrase may include the phrase "Missile was" in sequence. The sentence "It was a final test before delivering the missile to the armed forces" extends from an [EOS] token 86 to an [SEP] token 88. The model may generate tokens up to a predetermined length and truncate an output after generating an [EOS] token, which the model may learn in its fine-tuning.

Decoding may refer to a complete end-to-end process of generating sentences for a given model based on an input. Sampling may refer to a way in which an output token is selected from a model generated probability distribution at a particular time step. Paraphrase system 10 may use one or more different decoding methods. Since each generated token from the model may have a probability, sentence probability may be calculated using equation 27. Beam search may be used as a method of maximization-based decoding, which includes searching for sentences with the maximum probabilities. For open-ended generation, beam search might not yield high quality text, and may result in repetition. For directed text, the output may be tightly scoped to input. Beam search may store a select number of beams (e.g., sentences) with a maximum probability at every time step of the decoding process. The number of beams to store may be decided by a chosen beam-size. The model generates a probability distribution for each beam resulting from the previous decoding step. To find new beams for the current time-step, each probability distribution may be shifted up by their respective beam probabilities, and new beams with the highest probabilities among them may be selected. The last token in these new beams may be a result of indirect sampling from the distributions generated in the last step.

Figure 8:
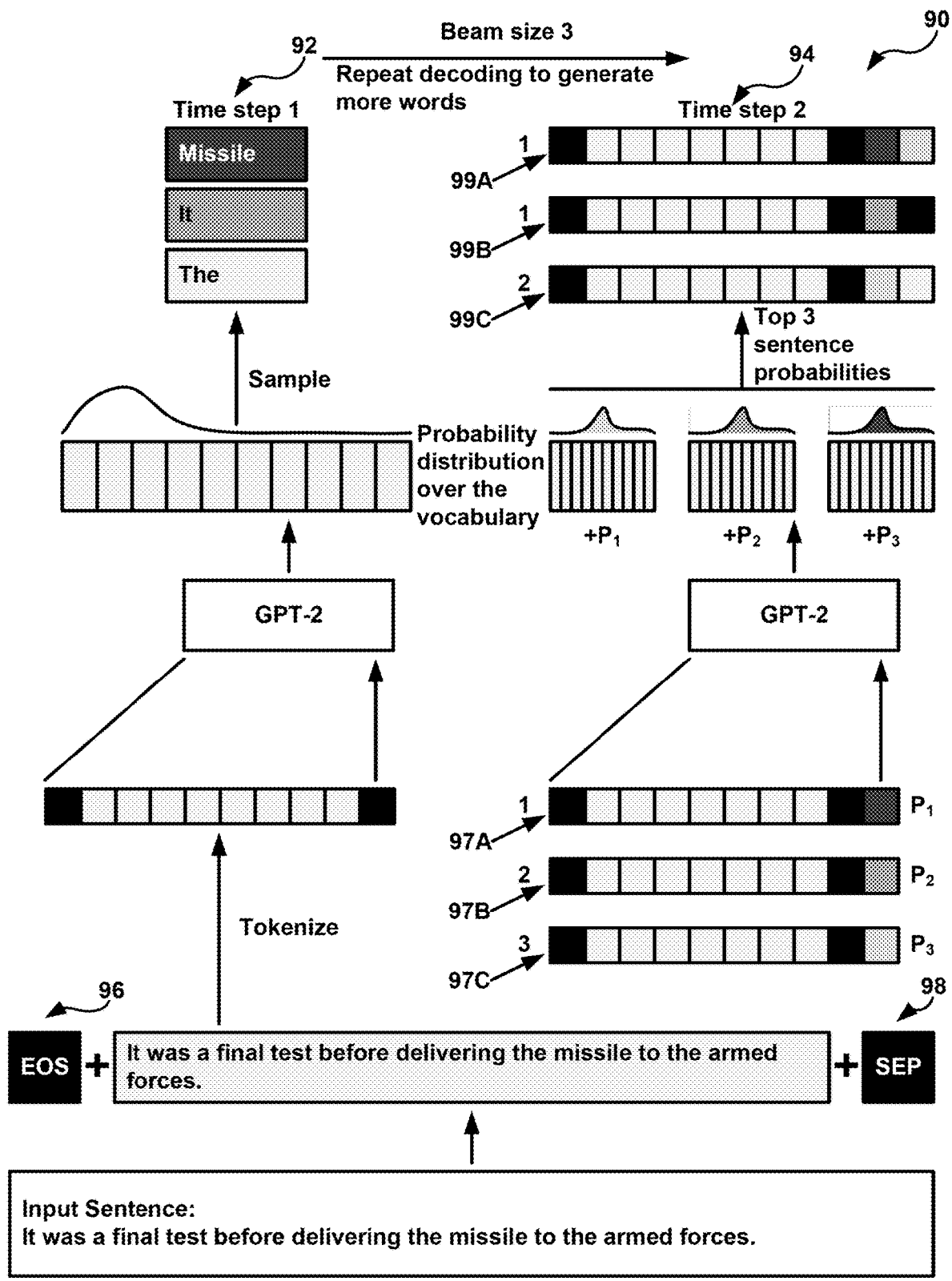
FIG. 8 is a conceptual diagram illustrating a set of time steps for using beam search as a method to search for most likely sentences, in accordance with one or more techniques of this disclosure.

FIG. 8 is a conceptual diagram illustrating a set of time steps 90 for using beam search as a method to search for most likely sentences, in accordance with one or more techniques of this disclosure. In some examples paraphrase generation system 42 of FIG. 1 may generate one or more paraphrase text samples using the beam search techniques of FIG. 8. The set of time steps 90 includes a first time step 92 and a second time step 94. In some examples, the set of time steps 90 may represent a pair of consecutive time steps of a sequence of time steps. In some examples, the sequence of time steps correspond to a sequence of tokens extending from an [EOS] token 96 to an [SEP] token 98. In some examples, at each time step of the sequence of time steps, the model may update a predetermined number of "beams" of tokens. For example, at the second time step 94, the model may update beams 97A-97C to beams 99A-99C. For example, the model may update beam 97A to beam 99A, the model may update beam 97B to beam 99B, and the model may update beam 97C to beam 99C. Updating a beam may comprise adding another token onto the beam.

As referred to herein, "beam size" may represent a predetermined number (e.g., three) of beams maintained at each time step of a sequence of time steps. At each time step of the sequence of time steps, the model may maintain the predetermined number of beams. For example, a predetermined number of sequences of tokens accumulated that may have the highest probability in a respective search space. At each time step, the model may generate the predetermine number (e.g., three) of probability distributions based on the predetermined number of beams maintained by the model. This may result in a vocabulary size times the predetermined number of sentence possibilities, from which the model selects the predetermined number of possibilities. FIG. 8 may show the process graphically for a set of two time steps 90. Notice that at each time step, the model may store the predetermined number of sentences with the highest probability. First time step 92 corresponds to the predetermined number of tokens with the highest probability, and at the second time step 94 the cumulative probability is considered.

Figure 9:
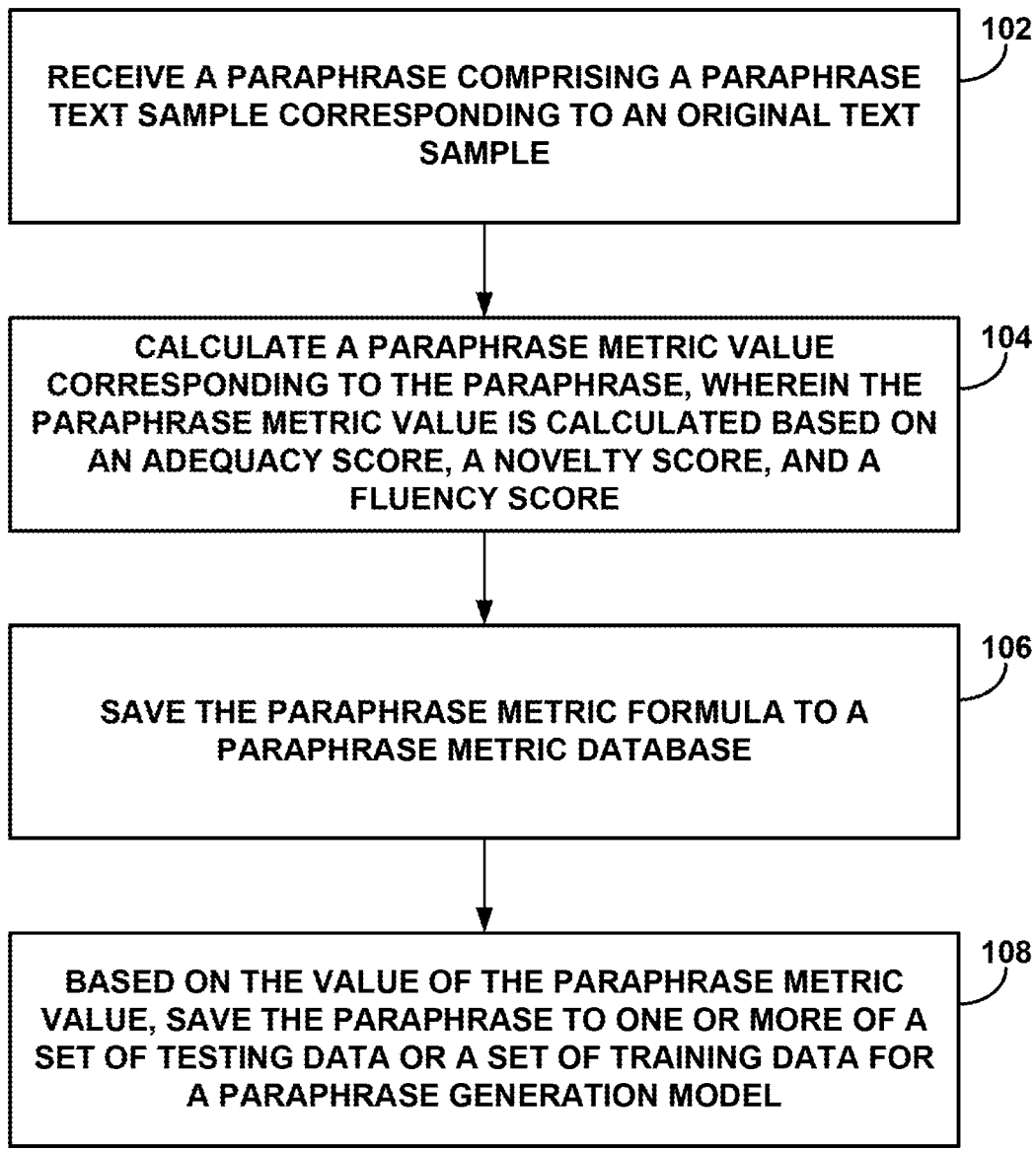
FIG. 9 is a flow diagram illustrating an example method for calculating a paraphrase metric based on an original text sample and a paraphrase text sample, in accordance with one or more techniques of this disclosure.

FIG. 9 is a flow diagram illustrating an example method for calculating a paraphrase metric based on an original text sample and a paraphrase text sample, in accordance with one or more techniques of this disclosure. FIG. 9 is described with respect to paraphrase system 10 of FIG. 1. However, the techniques of FIG. 9 may be performed by different components paraphrase system 10 or by additional or alternative medical device systems.

Processing circuitry 24 may receive a paraphrase comprising a paraphrase text sample corresponding to an original text sample (102). In some examples, the paraphrase text sample may restate the original text sample using at least some characters and/or words that are different from characters and/or words of the original text sample. In some examples, the paraphrase text sample may preserve a meaning of the original text sample and/or convey a meaning that is similar to the meaning of the original text sample. The paraphrase may, in some cases, be generated using a paraphrase generation model, but this is not required. The paraphrase may be a paraphrase received from a user device.

Paraphrase quality evaluation system 44 may control processing circuitry 24 to calculate a paraphrase metric value corresponding to the paraphrase, wherein the paraphrase metric value is calculated based on an adequacy score, a novelty score, and a fluency score (104). In some examples, the adequacy score indicates an extent to which the paraphrase text sample preserves a meaning of the original text sample. In some examples, the novelty score indicates a level of difference between the paraphrase text sample and the original text sample. In some examples, the fluency score indicates an extent to which the paraphrase text sample is devoid of repetition, spelling, and grammatical mistakes. Paraphrase quality evaluation system 44 may control processing circuitry 24 to save the paraphrase metric to a paraphrase metric database (e.g., the set of paraphrase quality metrics 36 stored by memory 26) (106). Paraphrase quality evaluation system 44 may control processing circuitry 24 to save the paraphrase to one or more of a set of testing data or a set of training data for a paraphrase generation model (108).

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
a memory; and
processing circuitry in communication with the memory, wherein the processing circuitry is configured to:
receive a paraphrase comprising a paraphrase text sample corresponding to an original text sample;
calculate a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes, and wherein the novelty score or the fluency score are configured to penalize the paraphrase metric value based on a longest common subsequence score of the paraphrase compared to a benchmark longest common subsequence score for a previously generated paraphrase;
save the paraphrase metric value corresponding to the paraphrase to a paraphrase metric database;
save the paraphrase and the paraphrase metric value to a set of training data for a paraphrase generation model;
update the paraphrase generation model using the set of training data including the paraphrase and the paraphrase metric value;
re-train, using first paraphrases associated with relatively high paraphrase metrics, the paraphrase generation model to generate paraphrases similar to the first paraphrases; and
re-train, using second paraphrases associated with relatively low paraphrase metrics, the paraphrase generation model to avoid generating paraphrases similar to the second paraphrases.

2. The computing system of claim 1, wherein the original text sample comprises a first set of characters and the paraphrase text sample comprises a second set of characters, wherein the second set of characters include one or more differences from the first set of characters.

3. The computing system of claim 1, wherein to calculate the paraphrase metric value, the processing circuitry is configured to:
determine the adequacy score;
calculate the novelty score based on the longest common subsequence score and the benchmark longest common subsequence score, wherein the benchmark longest common subsequence score corresponds to a group of paraphrase text samples each corresponding to the original text sample;
calculate the fluency score based on the longest common subsequence score of the paraphrase and the benchmark longest common subsequence score; and
calculate the paraphrase metric value based on the adequacy score, the novelty score and the fluency score.

4. The computing system of claim 1, wherein to calculate the paraphrase metric value, the processing circuitry is configured to calculate the paraphrase metric value based on the adequacy score, the novelty score, the fluency score and a paraphrase length score of the paraphrase, the paraphrase length score indicating an extent to which a length of the paraphrase text sample differs from a length of the original text sample.

5. The computing system of claim 4, wherein the processing circuitry is further configured to calculate the paraphrase length score based on the length of the paraphrase text sample and the length of the original text sample.

6. The computing system of claim 4, wherein to calculate the paraphrase metric value, the processing circuitry is configured to:
multiply the adequacy score, the novelty score, the fluency score, and the paraphrase length score such that:
when the novelty score is less than one, the novelty score weighs towards decreasing the paraphrase metric value so that the paraphrase metric value is lower than the adequacy score;
when the fluency score is less than one, the fluency score weighs towards decreasing the paraphrase metric value so that the paraphrase metric value is lower than the adequacy score; and
when the paraphrase length score is less than one, the paraphrase length score weighs towards decreasing the paraphrase metric value so that the paraphrase metric value is lower than the adequacy score.

7. The computing system of claim 1,
wherein to calculate the paraphrase metric value, the processing circuitry is configured to multiply the adequacy score, the novelty score, and the fluency score such that:
when the novelty score is less than one, the novelty score weighs towards decreasing the paraphrase metric value, and
when the fluency score is less than one, the fluency score weighs towards decreasing the paraphrase metric value.

8. The computing system of claim 1, wherein the processing circuitry is further configured to:
execute the paraphrase generation model in order to generate the paraphrase text sample based on the original text sample,
wherein the paraphrase generation model uses an artificial neural network (ANN), a deep neural network (DNN), or another kind of neural network.

9. The computing system of claim 8, wherein the processing circuitry is configured to:
save the paraphrase and the paraphrase metric value to a set of testing data, wherein the set of testing data includes a set of paraphrases generated by the paraphrase generation model, and wherein each paraphrase of the set of paraphrases corresponds to a paraphrase metric value of a set of paraphrase metric values; and
test, based on the set of paraphrases generated by the paraphrase generation model and the corresponding set of paraphrase metric values, an ability of the paraphrase generation model to generate quality paraphrases, wherein the paraphrase metric value corresponding to each paraphrase of the set of paraphrases indicates a level of quality of the respective paraphrase.

10. The computing system of claim 1, wherein the processing circuitry is further configured to evaluate, based on the paraphrase metric value, a quality of the paraphrase text sample.

11. The computing system of claim 1, wherein the paraphrase is a first paraphrase, wherein the paraphrase text sample is a first paraphrase text sample, wherein the original text sample is a first original text sample, wherein the paraphrase metric value is a first paraphrase metric value, wherein the adequacy score is a first adequacy score, the novelty score is a first novelty score, and the fluency score is a first fluency score, and wherein the processing circuitry is configured to:
- receive a second paraphrase comprising a second paraphrase text sample corresponding to a second original text sample;
- calculate a second paraphrase metric value corresponding to the second paraphrase, wherein the second paraphrase metric value is calculated based on a second adequacy score, a second novelty score, and a second fluency score of the second paraphrase;
- save the second paraphrase metric value corresponding to the second paraphrase to the paraphrase metric database; and
- save the second paraphrase and the second paraphrase metric value to a set of training data for the paraphrase generation model.

12. A method comprising:
- receiving, by processing circuitry in communication with a memory, a paraphrase comprising a paraphrase text sample corresponding to an original text sample;
- calculating, by the processing circuitry, a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes, and wherein the novelty score or the fluency score are configured to penalize the paraphrase metric value based on a longest common subsequence score of the paraphrase compared to a benchmark longest common subsequence score for a previously generated paraphrase;
- saving, by the processing circuitry, the paraphrase metric value corresponding to the paraphrase to a paraphrase metric database;
- saving, by the processing circuitry, the paraphrase and the paraphrase metric value to a set of training data for a paraphrase generation model;
- updating, by the processing circuitry, the paraphrase generation model using the set of training data including the paraphrase and the paraphrase metric value;
- retraining, by the processing circuitry and using first paraphrases associated with relatively high paraphrase metrics, the paraphrase generation model to generate paraphrases similar to the first paraphrases; and
- re-training, by the processing circuitry and using second paraphrases associated with relatively low paraphrase metrics, the paraphrase generation model to avoid generating paraphrases similar to the second paraphrases.

13. The method of claim 12, wherein the original text sample comprises a first set of characters and the paraphrase text sample comprises a second set of characters, wherein the second set of characters include one or more differences from the first set of characters.

14. The method of claim 12, wherein calculating the paraphrase metric value comprises:
- determining, by the processing circuitry, the adequacy score;
- calculating, by the processing circuitry, the novelty score based on the longest common subsequence score and the benchmark longest common subsequence score, wherein the benchmark longest common subsequence score corresponds to group of paraphrase text samples each corresponding to the original text sample;
- calculating, by the processing circuitry, the fluency score based on the longest common subsequence score of the paraphrase and the benchmark longest common subsequence score; and
- calculating, by the processing circuitry, the paraphrase metric value based on the adequacy score, the novelty score and the fluency score.

15. The method of claim 12, wherein calculating the paraphrase metric value comprises calculating the paraphrase metric value based on the adequacy score, the novelty score, the fluency score and a paraphrase length score of the paraphrase, the paraphrase length score indicating an extent to which a length of the paraphrase text sample differs from a length of the original text sample.

16. The method of claim 15, further comprising calculating, by the processing circuitry, the paraphrase length score based on the length of the paraphrase text sample and the length of the original text sample.

17. The method of claim 15, wherein calculating the paraphrase metric value comprises:
- multiplying the adequacy score, the novelty score, the fluency score, and the paraphrase length score such that:
- when the novelty score is less than one, the novelty score weighs towards decreasing the paraphrase metric value so that the paraphrase metric value is lower than the adequacy score;
- when the fluency score is less than one, the fluency score weighs towards decreasing the paraphrase metric value so that the paraphrase metric value is lower than the adequacy score; and
- when the paraphrase length score is less than one, the paraphrase length score weighs towards decreasing the paraphrase metric value so that the paraphrase metric value is lower than the adequacy score.

18. The method of claim 12, wherein calculating the paraphrase metric value comprises:
- multiplying the adequacy score, the novelty score, and the fluency score such that:
- when the novelty score is less than one, the novelty score weighs towards decreasing the paraphrase metric value, and
- when the fluency score is less than one, the fluency score weighs towards decreasing the paraphrase metric value.

19. A non-transitory computer readable medium comprising instructions that when executed cause one or more processors to:
- receive a paraphrase comprising a paraphrase text sample corresponding to an original text sample;
- calculate a paraphrase metric value corresponding to the paraphrase, wherein the paraphrase metric value is calculated based on an adequacy score, a novelty score, and a fluency score of the paraphrase, the adequacy score indicating an extent to which the paraphrase text sample preserves a meaning of the original text sample, the novelty score indicating a level of difference between words and characters of the paraphrase text sample and words and characters of the original text sample, and the fluency score indicating an extent to which the paraphrase text sample is devoid of repetition, spelling, and grammatical mistakes, and wherein the novelty score or the fluency score are configured to penalize the paraphrase metric value based on a longest common subsequence score of the paraphrase compared to a benchmark longest common subsequence score for a previously generated paraphrase;

save the paraphrase metric value corresponding to the paraphrase to a paraphrase metric database; and save the paraphrase and the paraphrase metric value to one or more of a set of testing data or a set of training data for a paraphrase generation model;

update the paraphrase generation model using the set of training data including the paraphrase and the paraphrase metric value re-train, using first paraphrases associated with relatively high paraphrase metrics, the paraphrase generation model to generate paraphrases similar to the first paraphrases; and re-train, using second paraphrases associated with relatively low paraphrase metrics, the paraphrase generation model to avoid generating paraphrases similar to the second paraphrases.

* * * * *